US011863553B2

United States Patent
Nitturkar et al.

(10) Patent No.: US 11,863,553 B2
(45) Date of Patent: Jan. 2, 2024

(54) MULTI-FACTOR IDENTITY VERIFICATION

(71) Applicant: MyHealthID, Inc., Tustin, CA (US)

(72) Inventors: Jay Nitturkar, Tustin, CA (US); Erika Eördögh, Tustin, CA (US)

(73) Assignee: MyHealthID, Inc., Tustin, CA (US)

( * ) Notice: Subject to any disclaimer, the term of this patent is extended or adjusted under 35 U.S.C. 154(b) by 207 days.

(21) Appl. No.: 17/035,650

(22) Filed: Sep. 28, 2020

(65) Prior Publication Data

US 2021/0105271 A1 Apr. 8, 2021

Related U.S. Application Data

(60) Provisional application No. 62/907,501, filed on Sep. 27, 2019.

(51) Int. Cl.
*H04L 9/40* (2022.01)
*G06Q 40/08* (2012.01)
*G06Q 50/26* (2012.01)

(52) U.S. Cl.
CPC ......... *H04L 63/0861* (2013.01); *G06Q 40/08* (2013.01); *G06Q 50/265* (2013.01); *H04L 63/083* (2013.01); *H04L 2463/082* (2013.01)

(58) Field of Classification Search
CPC ............... H04L 63/0861; H04L 63/083; H04L 2463/082; G06Q 40/08; G06Q 50/265; H04W 12/06
See application file for complete search history.

(56) References Cited

U.S. PATENT DOCUMENTS

| | | | | |
|---|---|---|---|---|
| 10,341,353 B1* | 7/2019 | Yaacoby | ............. | H04L 63/0428 |
| 10,521,580 B1* | 12/2019 | Fox | ......... | G06F 21/32 |
| 2009/0055915 A1* | 2/2009 | Piliouras | ................ | G06F 21/41 |
| | | | | 726/8 |
| 2012/0218078 A1* | 8/2012 | Hill | ..................... | H04L 63/0492 |
| | | | | 340/5.82 |
| 2014/0279516 A1* | 9/2014 | Rellas | ............... | G06Q 20/4012 |
| | | | | 705/318 |
| 2014/0359722 A1* | 12/2014 | Schultz | ............... | H04L 63/0861 |
| | | | | 726/5 |
| 2017/0357941 A1* | 12/2017 | Best | ....................... | G06Q 10/10 |
| 2018/0115540 A1* | 4/2018 | Moiyallah, Jr. | ........ | H04W 12/06 |

FOREIGN PATENT DOCUMENTS

| | | | |
|---|---|---|---|
| CN | 108305364 | * | 7/2018 |
| FR | 9803096 | * | 9/1999 |

OTHER PUBLICATIONS

Tadviser, RecFaces Id-ME, author unknown, 2017 (Year: 2017).*

* cited by examiner

*Primary Examiner* — Piotr Poltorak
(74) *Attorney, Agent, or Firm* — One LLP

(57) ABSTRACT

Provided are embodiments of systems, devices and methods for multi-factor identity verification, which may include utilization of automated picture ID to Selfie matching, cross-reference address information, biometrics and geo-location information and unique smartphone device identifiers, especially in the context of healthcare industry.

20 Claims, 53 Drawing Sheets

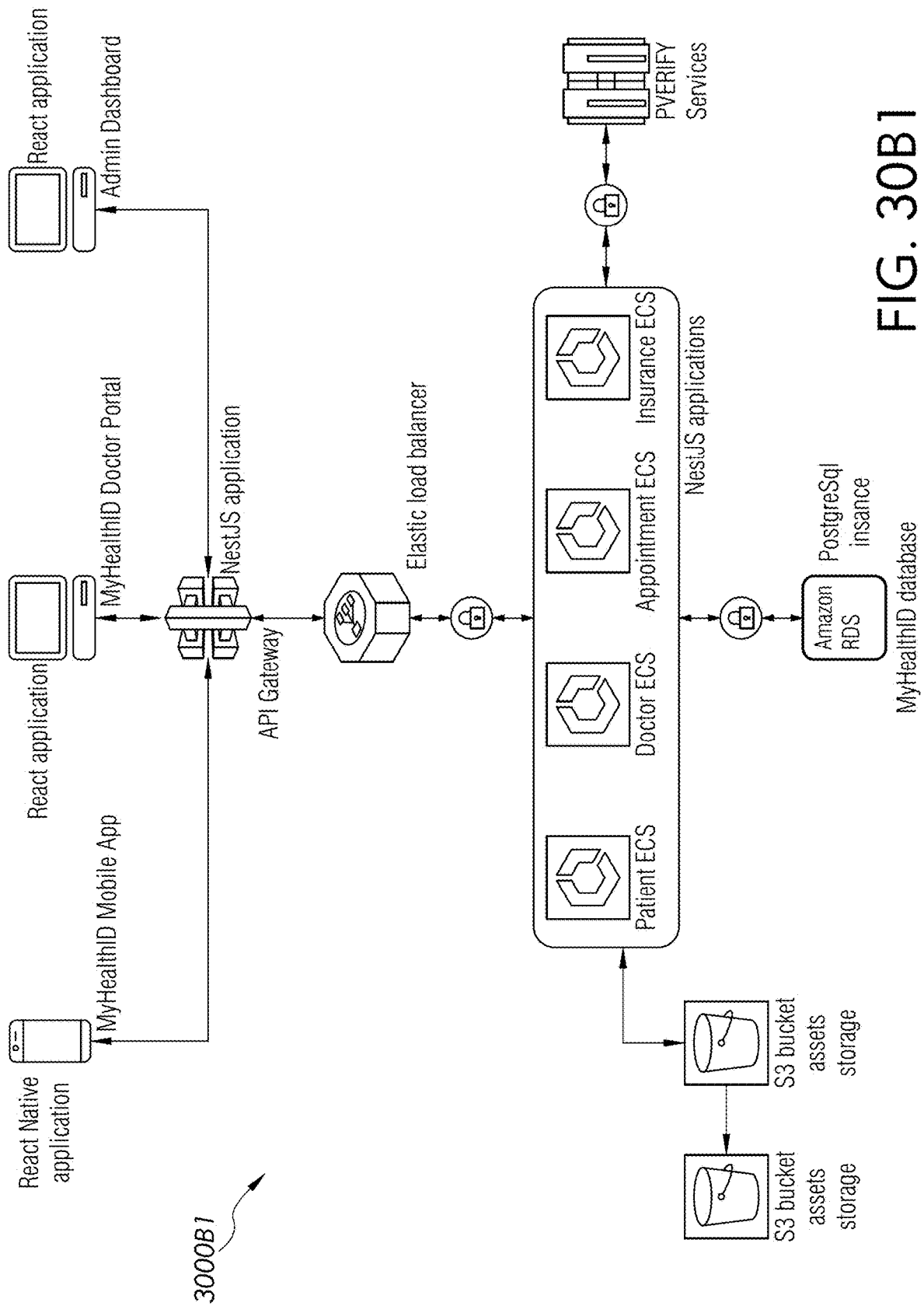
FIG. 30B1

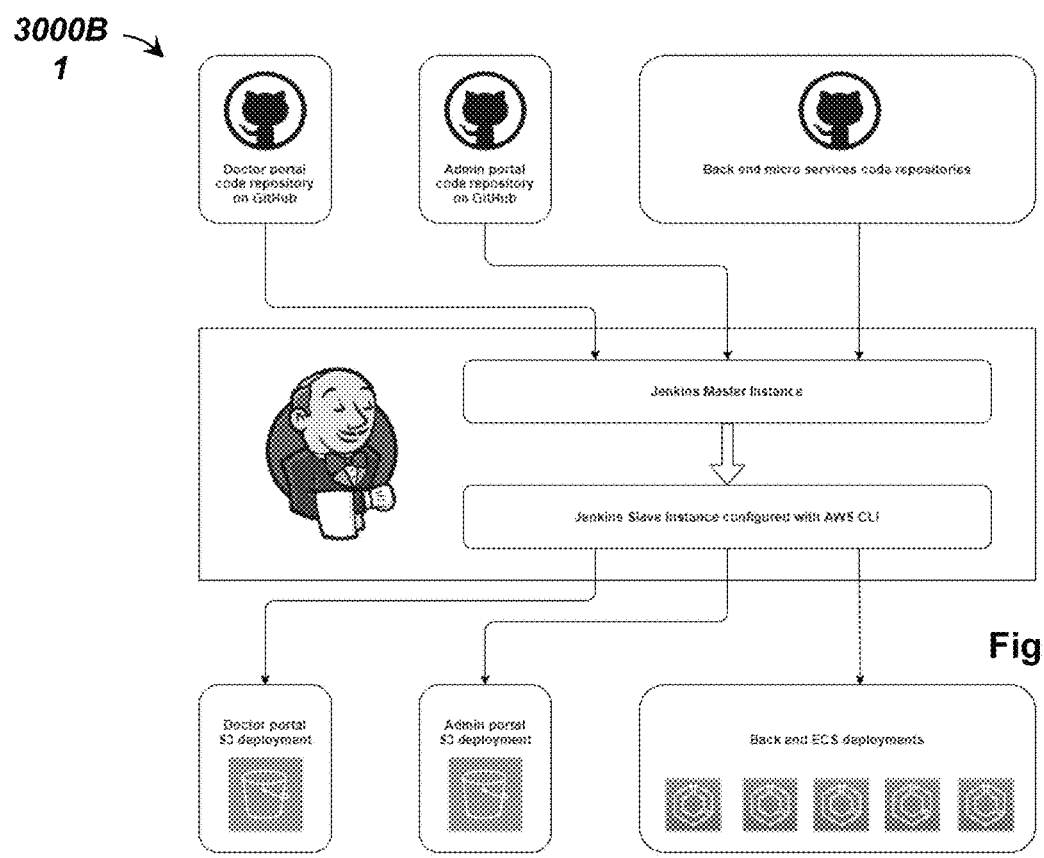
Figure 30B2

MULTI-FACTOR IDENTITY VERIFICATION

CROSS-REFERENCE TO RELATED APPLICATIONS

The present application claims priority to U.S. Provisional Patent Application No. 62/907,501, filed Sep. 27, 2019, the disclosure of which is hereby incorporated in its entirety by reference for all purposes.

FIELD

Embodiments of the present disclosure generally relate to multi-factor identity verification, and more specifically to utilization of automated picture ID to Selfie matching, cross-reference address information, biometrics and geo-location information.

BACKGROUND

Currently, we are seeing a paradigm shift in the delivery of healthcare, moving to value-based reimbursement models and patient-centric care, is changing the way medical care is provided. Healthcare providers are becoming increasingly aware that today's patients have more control over how they obtain care and pay for it. Many providers now view patients as "consumers," given the rise of high-deductible healthcare plans, increased access to mobile health and the desire for enhanced transparency in price and quality. The delivery of healthcare is moving from large buildings and big offices into patient's homes and mobile devices. By bringing patient-centric care to the forefront, the patient is no longer a passive recipient of healthcare services. Patient engagement and empowerment requires a more proactive approach. The use of mobile apps can deliver patient-centric values, continuity of care, information and education, self-care monitoring proactively to the patient. Mobile apps can enhance the usability and access to health information and enhance the communication between healthcare providers and patients in managing and controlling everything from health-related information and alerts, appointment setting and reminders, to understanding healthcare benefits and costs. The need for free flow of information between providers, payers, patients, ACOS, and other entities in the diverse system of healthcare requires interoperability through the use of electronic data. Utilization of electronic data and the benefits of mobility requires strong security measures, proactive safeguards and ongoing measures to ensure encrypting of data in motion and at rest. And while the emphasis of data security focuses on keeping electronic patient health information (ePHI) safe, the validity of patient identification is given little thought.

HIPAA (Health Insurance Portability and Accountability Act of 1996) recognized the need for unique identifier for individuals as an essential component. There is evidence that a unique identifier for individuals in healthcare would have many benefits, including improved quality of care and reduced costs. Currently, various health care organizations and insurance companies, integrated delivery systems, health plans, managed care organizations, public programs, clinics, hospitals, physicians, and pharmacies routinely assign identifiers to individuals for use within their own systems. There are multiple identifiers for the same individual within or across organizations which prevents or inhibits timely access to integrated information. Efforts to assure continuity of care, accurate record keeping, effective follow-up and preventive care, prompt payment, and detection of fraud, waste, and abuse all could benefit from the availability of a single unique identifier for individuals with appropriate protections against misuse and unauthorized use outside of health care.

Accordingly, it is advantageous to provide methods and systems for multi-factor identity verification, and more specifically to utilization of automated picture ID to Selfie matching, cross-reference address information, biometrics and geo-location information and unique smartphone device identifiers (e.g., UUID or Instance ID), especially in the context of healthcare industry.

SUMMARY

Provided herein are example embodiments of systems, devices and methods for multi-factor identity verification, which may include utilization of automated picture ID to Selfie matching, cross-reference address information, biometrics and geo-location information and unique smartphone device identifiers (e.g., UUID or Instance ID), especially in the context of healthcare industry. Based on proprietary algorithms, the systems, devices and methods of the present disclosure may generate security matching score that may be used for establishing identity of the user. In some embodiments, when the security matching score is lower than a specified level, further additional validation techniques may be employed to ensure very high degree of accuracy.

In some embodiments, the present disclosure may include a software application, which may also be referred to herein as MyHealthID™ app, MyHealthID, or simply app, which understands the healthcare industry's need for a universally used health identifier for patients.

As used herein, the MyHealthID™ app may include complete a software system (front end and back end with patient-facing apps (e.g., on iOS and Android) and physician-facing web portal and backend for managing all the data and patient-physician communication and securely storing all the HIPAA data securely.

Generally, systems, devices and methods for multi-factor identity verification of the present disclosure may include at least the following features:

1. Multi-factor Identify Verification.
2. MyHealthID Unique Identifier.
3. OAuth for Healthcare (easy login to healthcare EHR or systems using unique identifier).
4. App that allows patients to securely share their insurance and demographics details (including, e.g., images of driver's license, insurance card as well as their health insurance benefits and medical records) when making new appointments.
4. Lookup Service for Emergency Providers (e.g., to find patient details to bill their insurance company and to collect money from them).
5. Quick Patient on-boarding SDK (software development kit) for healthcare apps and Web portals (that works both for current MyHealthID users as well as for brand new patients).
6. Preventive Care 'Nudge Engine' to remind patients about the need for certain tests, doctor visits, etc., based on CDC, Medicare and government guidelines customized based on, e.g., age, gender, ethnicity, medical history and medical conditions.
7. Provision for two-way communication between patient and provider which allows any of the 'care team' doctors to send patient-specific messages and for patients to send doctor-specific messages securely using the MyHealthID app and the provider portal.

In some embodiments, the present disclosure may include a system and a computer-based method for multi-factor identity verification, comprising: transmitting a digital passcode to a user device; upon receiving the digital passcode from the user device, transmitting a first request to the user device, requesting a first image, wherein the first image comprises at least a first photo of a user and an address of the user; upon receiving the first image, transmitting a second request to the user device, requesting a second image, wherein the second image includes a real-time photo of the user; upon receiving the second image, validating the first photo with the second photo; validating the address of the user; and upon successful validation of the first photo and the address of the user, generating a verification score.

In some embodiments, the MyHealthID app may generate, utilize and manage a unique ID for every patient that would allow for the rapid and accurate identification of the proper records and their integration for the purpose of providing high quality, patient-focused care. The first step in this process may be or may include for patients to be positively identified. Through the MyHealthID app this goal is attainable.

The term user and patient may be used interchangeably herein as various exemplary embodiments of the present disclosure refer to the use of the systems and methods disclosed herein in the healthcare industry or landscape.

Additionally, the system and process of the present disclosure may also include proper validation and authentication of patients to serve multiple purposes, for example as used within the healthcare environment. There is considerable support within the healthcare industry for the adoption of a unique identifier for individuals. These organizations—e.g., American Nurses Association, Health Level Seven, National Association of Chain Drug Stores, and National Council for Prescription Drug Programs—cited that a unique individual identifier could reduce administrative workloads and costs, enable faster access to critical health information, and increase efficiency in the exchange of electronic data. As recently as April 2016, the American Health Information Management Association (AHIMA) came out strongly for a universal patient ID. They released this statement to urge all stakeholders in healthcare industry, "We support a voluntary patient safety identifier. Accurate patient identification is critical in providing safe care, but the sharing of electronic health information is being compromised because of patient identification issues." The present disclosure provides the systems and methods to achieve these goals and more.

MyHealthID-Unique Identifier

In some embodiments, the present disclosure may include systems and methods for creating, utilizing and managing a unique identifier for all patients (e.g., each individual patient has a unique identifier throughout the whole industry).

In some embodiments, the MyHealthID app strives to become the authority in Patient Identification. By the utilization of automated picture ID (e.g., government issued photo ID) to Selfie (real-time) matching, the In-app validation process may provide a high level of confidence that the identity claimed by the user corresponds to the owner of that identity in the real-world. It may be necessary to validate that the real-world identity exists, the digital identity matches, and the person making the identity claim also matches. In some embodiments, the MyHealthID app may cross-reference the address information obtained either by the government issued ID or manually entered by the user with the address information from real-time, health insurance verification process. Health insurance eligibility verification process may involve sending user's member ID and demographics details to their health insurance company and getting confirmation of their coverage, benefits and validation of their address and demographics. This unique method may provide key information that is valuable. Beyond validating a patient (user), this process may also capture the most up-to-date patient profile including, for example, their current health insurance policy details including their health benefits. Additionally, MyHealthID app may use biometrics (e.g., face scan, fingerprint) and geo-location data as an added measure of validation. Verifying and authenticating a user is the key, this process along with verifying the user's demographics allows MyHealthID app to build a database of patient profiles. Only users (patients) who have completed the identity verification process may have a MyHealthID app generate a unique identifier called the HealthID. Each authenticated user profile may be given a unique identification number. In some embodiments, the number may be generated using a secure random algorithm.

The method and system for generating the unique MyHealthID ID as described above and further herein are inventive and not well-understood, not routine, and not conventional activities previously known, especially to the healthcare industry.

Additionally, the method and system for generating the unique MyHealthID ID as described above and further herein provide specific technological improvements in the verification and authentication of a user ID by using, for example, a real-time, real-world selfie to match with a captured image of the ID.

"OAuth" for Healthcare

In some embodiments, the present disclosure may include systems and methods for patient (user) validation specific for healthcare.

In some embodiments, OAuth for Healthcare may allow patients (who are MyHealthID app users with a unique HealthID) to login/create accounts with healthcare organizations. For example, when a patient is attempting to login into a physician's Patient Portal/EHR/Billing System to schedule an appointment or a Medical Group website to access their patient portal, this patient would be able to Login using his/her MyHealthID account. OAuth for Healthcare powered by MyHealthID may be the authority on patient because of MyHealthID multi-factor identity verification process. Healthcare organizations may rely on MyHealthID for validation of patient's identity. Healthcare organizations would recognize that users who login/signup using this method have gone through a rigorous identity verification process and can be confident in the identity of the user. In an exemplary application, this feature can allow a patient who might be in emergency room to gain access to their own medical records, lab reports, etc. 'on the fly' from the hospitals/medical groups or labs etc., without having to remember login info to those various entities. This feature can be of immense help to people who might fall sick in a remote town and have no way to access their health data from their regular medical providers. Additionally, using the systems and methods of the present disclosure, healthcare organizations can allow faster and 100% accurate patient on-boarding/patient sign-on when a patient is trying to make a new appointment with a doctor, hospital, lab or any other type of healthcare organization.

Currently, some healthcare websites allow sign in using social media, for example, 'sign-in with Facebook' or 'Sign-in with Google', for partially capturing some information like patient name etc. But this practice is insecure, dangerous, and not really HIPAA compliant since one can easily create multiple and even fake users in Facebook or even Google. MyHealthID's multi-factor patient authentication system designed for healthcare needs, on the other hand exceeds all existing HIPAA and security guidelines in the healthcare industry and hence will be ideal patient on-boarding 'widget'. Added the advantages of MyHealthID, OAuth will already has patient's up-to-date health insurance and benefits information, both the financial values as well as actual images of front and back of insurance card and driver license, etc., making the patient sign-on for any physician or hospital office very fast and efficient.

Look Up Service for Emergency Providers

In some embodiments, the present disclosure may include an optimized database of patient profiles used to assist emergency providers (e.g., hospitals, ambulances, first responders) in finding and billing the right payer (e.g., health insurance company).

In some embodiments, an optimized MyHealthID database of patient profiles may be used to assist healthcare providers find and match up patient profiles (patients using MyHealthID app may need to give permission for this function). Often, a hospital (or other Emergency Providers or healthcare providers) has incomplete patient demographics or insurance data due to which they are unable to properly bill the patient and/or insurance payer. This can cause big losses to both hospital/physician group and also hurt patient's finances and credit.

In some embodiments, for example as in an attempt (maybe a last resort in some cases) to collect on an outstanding claim, emergency providers can use the patient information they obtain to use MyHealthID Patient Lookup services. Depending on the type of information obtained by emergency providers and the available information provided by MyHealthID, various search criteria may be utilized to match a MyHealthID profile (including photo of the patient). The match would provide complete and accurate patient demographics and insurance information which will allow emergency providers the opportunity to bill the correct insurance payer and/or patient.

This summary and the following detailed description are merely exemplary, illustrative, and explanatory, and are not intended to limit, but to provide further explanation of the invention as claimed. Additional features and advantages of the invention will be set forth in the descriptions that follow, and in part will be apparent from the description, or may be learned by practice of the invention. The objectives and other advantages of the invention will be realized and attained by the structure particularly pointed out in the written description, claims and the appended drawings.

BRIEF DESCRIPTION OF THE DRAWINGS

The present invention may be better understood by referring to the following figures. The components in the figures are not necessarily to scale. Emphasis instead being placed upon illustrating the principles of the disclosure. In the figures, reference numerals designate corresponding parts throughout the different views.

Figure 2B:
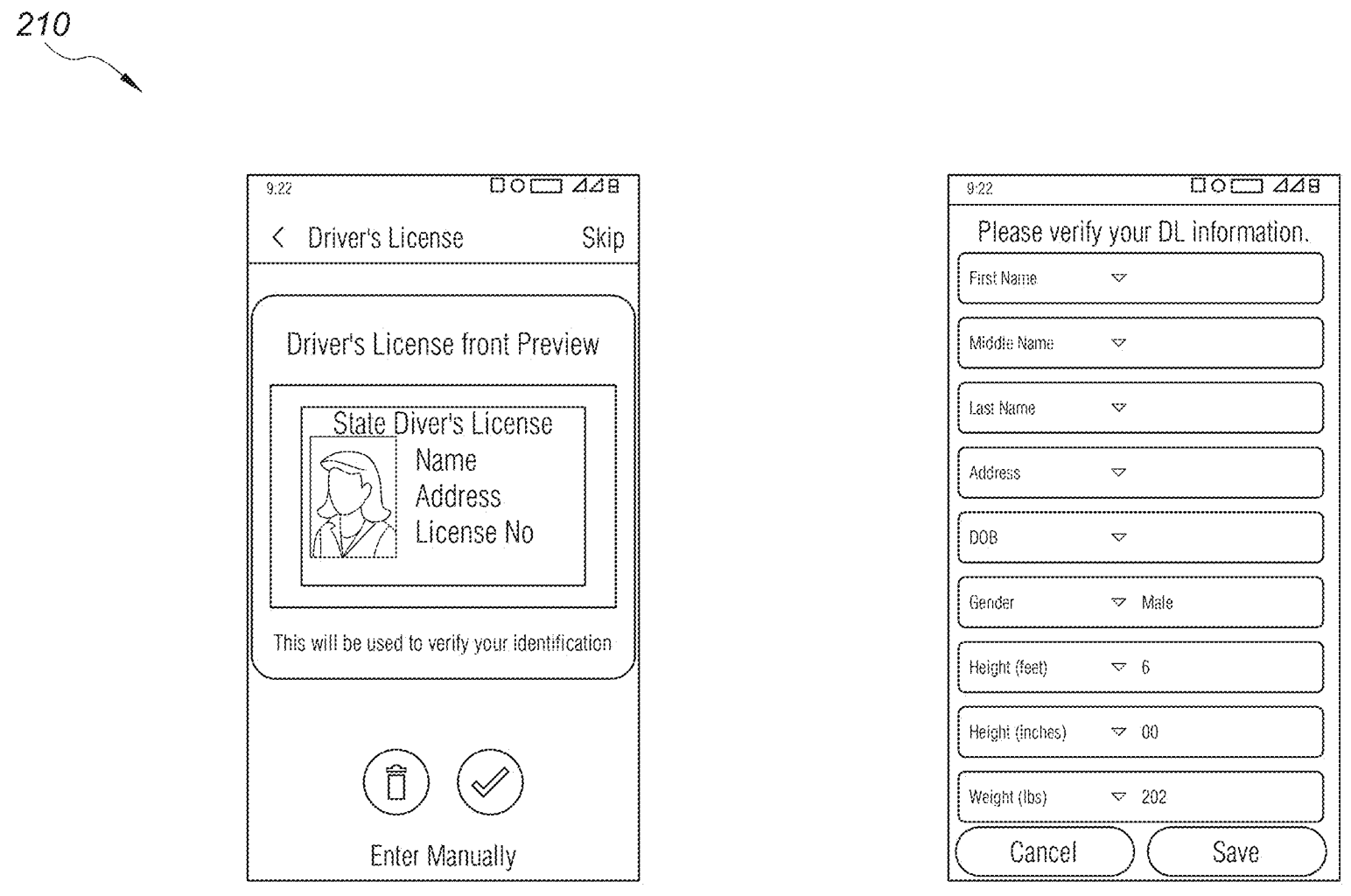

FIGS. 2A and 2B illustrate exemplary graphical user interfaces for capturing information from a document for authentication, according to some embodiments of the present disclosure.

FIG. 4 illustrates an exemplary graphical user interface for PIN verification, according to some embodiments of the present disclosure.

FIG. 7 illustrates an exemplary graphical user interface for update personal information, according to some embodiments of the present disclosure.

FIG. 8 illustrates an exemplary graphical user interface for update health insurance information, according to some embodiments of the present disclosure.

FIG. 9 illustrates an exemplary graphical user interface for search for a provider, according to some embodiments of the present disclosure.

FIGS. 12, 13, 14, and 15 illustrate exemplary user interfaces for providers, according to some embodiments of the present disclosure.

FIG. 17 illustrates an exemplary graphical user interface for reminders, according to some embodiments of the present disclosure.

FIG. 30B1 illustrates another example high-level diagram of an overall system architecture, according to some embodiments of the present disclosure.

FIG. 30B2 illustrates further exemplary detail for system architecture as illustrated in FIG. 30B1, according to some embodiments of the present disclosure.

DETAILED DESCRIPTIONS

Figure 1:
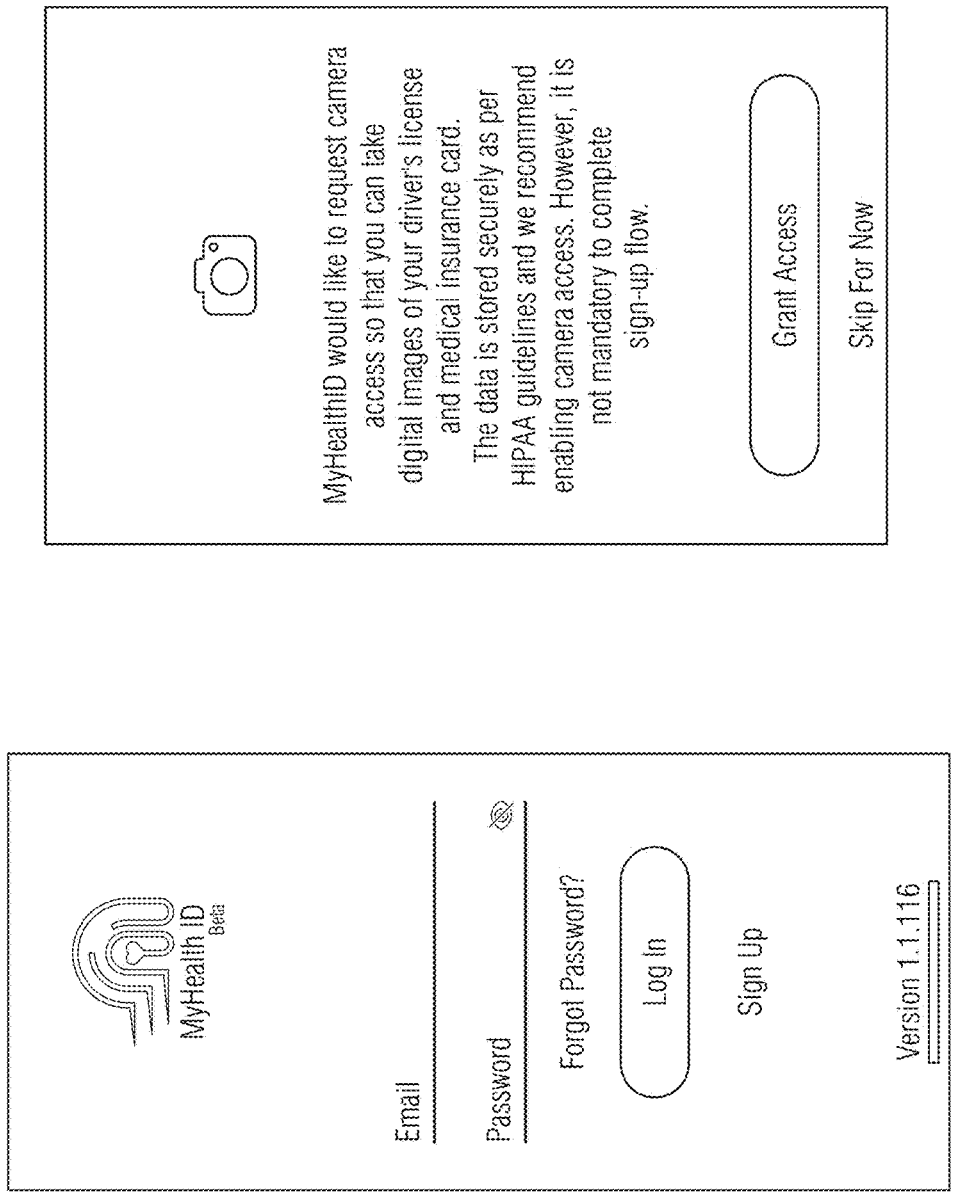
FIG. 1 illustrates an exemplary graphical user interface for Signup, according to some embodiments of the present disclosure.

The following disclosure describes various embodiments of the present invention and method of use in at least one of its preferred, best mode embodiments, which is further defined in detail in the following description. Those having ordinary skill in the art may be able to make alterations and modifications to what is described herein without departing from its spirit and scope. While this invention is susceptible to different embodiments in different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated. All features, elements, components, functions, and steps described with respect to any embodiment provided herein are intended to be freely combinable and substitutable with those from any other embodiment unless otherwise stated. Therefore, it should be understood that what is illustrated is set forth only for the purposes of example and should not be taken as a limitation on the scope of the present invention.

As used herein and in the appended claims, the singular forms "a," "an," and "the" include plural referents unless the context clearly dictates otherwise.

In general, terms such as "coupled to," and "configured for coupling to," and "secure to," and "configured for securing to" and "in communication with" (for example, a first component is "coupled to" or "is configured for coupling to" or is "configured for securing to" or is "in communication with" a second component) are used herein to indicate a structural, functional, mechanical, electrical, signal, optical, magnetic, electromagnetic, ionic or fluidic relationship between two or more components or elements. As such, the fact that one component is said to be in communication with a second component is not intended to exclude the possibility that additional components may be present between, and/or operatively associated or engaged with, the first and second components.

In the following description and in the figures, like elements are identified with like reference numerals. The use of "e.g.," "etc.," and "or" indicates non-exclusive alternatives without limitation, unless otherwise noted. The use of "including" or "includes" means "including, but not limited to," or "includes, but not limited to," unless otherwise noted.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

Provided herein are example embodiments of systems, devices and methods for multi-factor identity verification, which may include utilization of automated picture ID to Selfie matching, cross-reference address information, biometrics and geo-location information and unique smartphone device identifiers (e.g., UUID or Instance ID), especially in the context of healthcare industry. Based on proprietary algorithms, the systems, devices and methods of the present disclosure may generate security matching score that may be used for establishing identity of the user. In some embodiments, when the security matching score is lower than a specified level, further additional validation techniques may be employed to ensure very high degree of accuracy. This may include, for example, sending an email or message to the patient or a mail to the patient's physical address with some PIN code for the patient to enter in the app to complete the validation process, requesting retaking pictures, a phone call to record voice of the patient, etc.

Unique ID

Identity verification plays an important role in our daily life, numerous activities require us to verify who we are by showing our Identification documents (IDs) which typically contain a face image as proof of identity. This process is the norm, nearly everyone is accustomed to this method in the real-world. However, healthcare settings provide some unique challenges since most patient appointments are scheduled days in advance hence validation of patient's identity and patient's insurance information and benefits becomes important. Embodiments of the present disclosure provide an application, which may be referred to herein as MyHealthID™ App, that strives to become the authority in user identification, e.g., as used in Patient Identification in the healthcare industry. With the utilization from automated picture ID (e.g., government issued photo ID) to Selfie matching, an in-app validation process may provide a high level of confidence that the identity claimed by the user corresponds to the owner of that identity in the real-world. It may be necessary to validate that the real-world identity exists, the digital identity matches, and the person making the identity claim also matches. In some embodiments, the MyHealthID app may also cross-reference the address information obtain either by the government issued ID or manually entered by the user with the address information from the user's health insurance eligibility verification process. This unique method may provide key information that is valuable. Beyond validating a patient (user), this process may also capture the most up-to-date patient profile.

Additionally, MyHealthID may use biometrics (e.g., face scan, fingerprint, etc.) and geo-location data as an added measure of validation. Verifying and authenticating a user is a key feature, this process along with verifying the user's demographics allows MyHealthID to build a database of patient profiles. Only users (patients) who have completed the identity verification process may have a MyHealthID app generate a unique identifier called the HealthID. Each authenticated user profile may be given a unique identification number. In some embodiments, the number may be generated using a secure random algorithm.

In some embodiments, MyHealthID app may be a mobile application for patient users. The app may be available in various platforms, for example, for both Android and iOS platforms. Additionally, there may be a clinic desktop application/website for providers. In some embodiments, the app may consist of six (6) sections: Benefits, Find Care, Health Alerts, Appointments, Emergency Info, and Chat Bot.

For patients, in some embodiments, MyHealthID app may allow patients (users) to know their own healthcare benefits at the time of service. For example, patients can see insurance eligibility information regarding deductible amount, deductible remaining, out of pocket maximum, copay by specialty, in and out of network, and other related patient costs so that they can make informed decisions. The patients can use the mobile app, the website, on a tablet or any device with an internet browser and data connection. The need for cost transparency is increasing in demand. Currently, patients do not know or understand their benefits very well. Patients can use some insurance websites to find benefit information, but it is difficult to read through and understand. MyHealthID app solve the problem of patients not knowing what their out of pocket costs will be at the time of service.

Generally, certain percentage (about 5%) of all patients (new and existing) seen by providers have some issue related to demographic or insurance data. Existing providers sometimes are unaware of patients' information updates such as change in insurance plan or even primary care provider (PCP) while plan remains the same. Such information gaps can be costly. In some embodiments, MyHealthID app can benefit providers because it provides more accurate and up-to-date information of patient's personal, health, and insurance data, while saving time (increased administrative efficiency). Providers can use the mobile version on a smartphone, the website, a tablet, or any device with an internet browser and data connection. Benefits to providers may include, for example:

Reduced Error Rate: MyHealthID app can reduce the error rate on patient information. Current estimates in systems without MyHealthID app are that 20% of new patient information has errors which on average costs $100.00 to fix.

Time saving: MyHealthID app can reduce the amount of time spent interacting with patients (streamline workflows and increase efficiency) when calls are made to providers.

MyHealthID app can reduce potential for fraud.

The provider can download patient data from users who have granted them access. They can search for a patient and request access.

In various embodiments disclosed herein, MyHealthID app may make personal health meaningful, useful, and a value for patients (users) and providers. MyHealthID app may provide near real-time accurate eligibility information at the point of service along with a cost estimator for specific types of procedures, CPT codes, charges, etc., and give the patient and the provider an accurate assessment of the patient's out of pocket responsibility.

Signup/Setup

Figure 22:
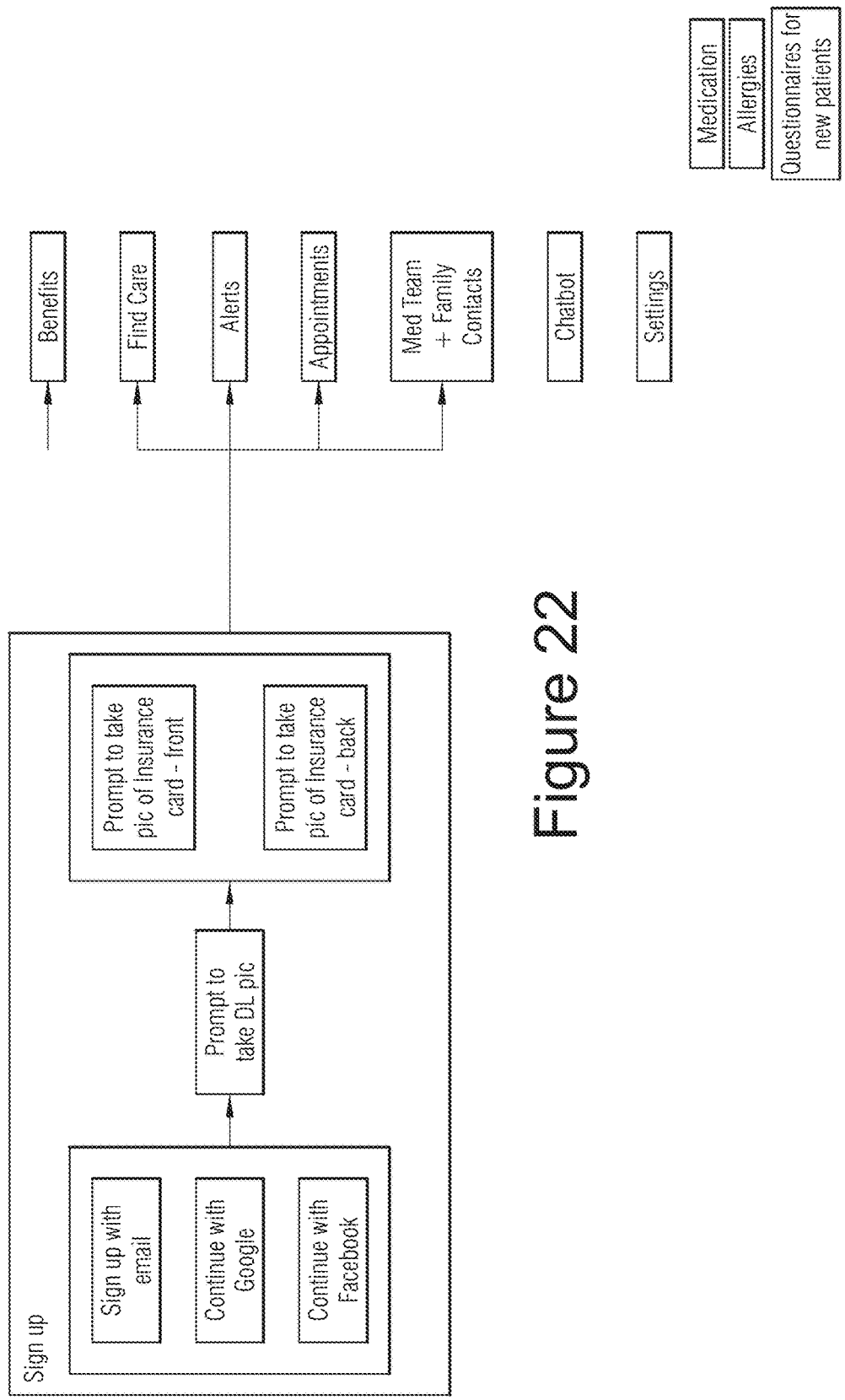
FIG. 22 illustrates an exemplary high-level flow diagram of a signup/setup process, according to some embodiments of the present disclosure.

In some embodiments, generally, the system may require users to download the app from a supported platform and go through a Signup process. FIG. 22 illustrates and example high level flow diagram of a signup/setup process 2200, according to some embodiments.

Returning to FIG. 1, FIG. 1 illustrates an exemplary graphical user interface 100 for Signup, according to some embodiments. In some embodiments, one of the first steps in the sign-up process may involve validation of phone number via OTP (one-time passcode) sent to the user's smart phone. In-app validation may require the user to add pictures, for example, of the front and back of their government issued ID (as shown in an exemplary graphical user interface 200 and 210 in FIG. 2A and 2B). Additionally, the user may also be required to take a selfie (that may be used to compare with the picture from the driver's license as part of the overall Patient Identify Verification algorithm, as illustrated in FIG. 2C). This in-app validation process provides a high level of confidence that the identity claimed by the user corresponds to the owner of that identity in the real-world. The app validates that the real-world identity exists, the digital identity matches, and the person making the identity claim also matches. In some embodiments, methods of validation may include at least these:

VALIDATE AUTHENTICITY: Validate the authenticity of a government issued ID (e.g., Drivers' License, Identification Card).

COMPARE IMAGE: Compare a face image from the Drivers' License card with a real-time selfie from the new user.

COMPARE ADDRESS: Compare the home address shown on the Drivers' License card with Insurance Card (if available), eligibility (EDI 270/271) response, and geo-location data.

BIOMETRICS: using, for example, face scan and fingerprint smartphone functions.

PHONE: pin code validation.

MAC address (device address)/Unique smartphone device identifiers (e.g. UUID or Instance ID) validation with user's permission.

In some embodiments, the app may compare the geo-location of the user with the address given on the driver's license (e.g., captured via OCR process, image capture or manual data entry) as well as the address that is returned by the health insurance company and assign a confidence score about the patient's identity. For example, if the address of Driver's License matches with that from the Insurance Eligibility Verification process, and also matches with the patient's dominant geo-location (location that the user is present maximum time over a day and continuously over a period of time), then the app may assign a high confidence level or score (e.g., 99%) for patient's identity. Conversely, a low confidence level or score may be assigned if one or both comparisons do not match. In some embodiments, the app may allow the patient to retake the picture(s) or reenter the data, within a preset limitation.

The In-app validation may be a necessary step to authenticate the user so the app can generate a unique MyHealthID for each user. This unique ID may be the foundation for the future in healthcare. There may be a need for every individual to have a unique identifier specific for healthcare use. The MyHealthID could be utilized across all entities within the healthcare landscape.

Figure 3:
FIG. 3 illustrates an exemplary graphical user interface for capturing insurance card information, according to some embodiments of the present disclosure.

Next, in some embodiments, as illustrated in the exemplary user interface 300 in FIG. 3, the user can add pictures of his/her insurance card or manually enter the information. The user may also review the information, read and accept terms and conditions to Join/sign-up.

Figure 4:
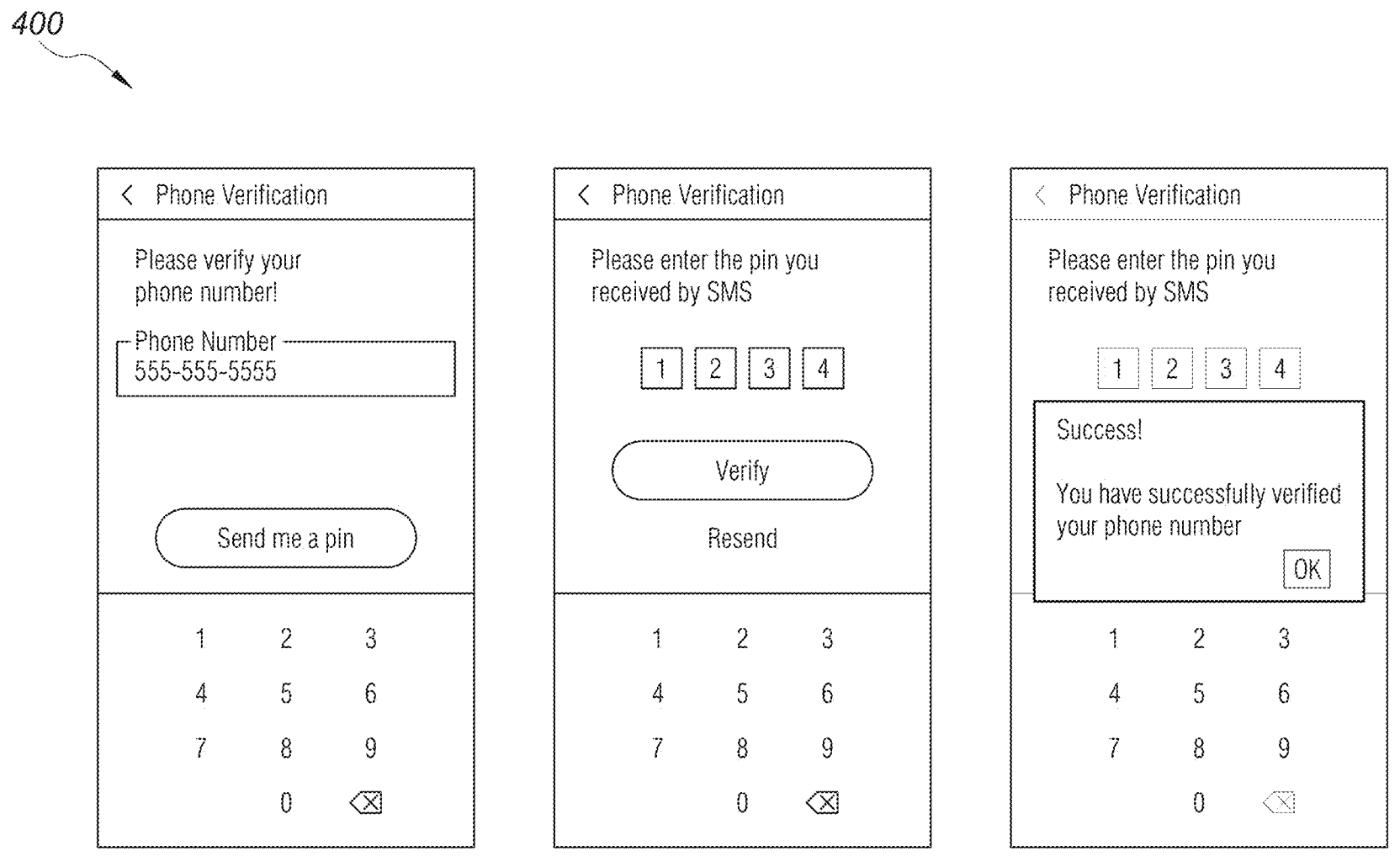

In some embodiments, as illustrated in the exemplary user interface 400 in FIG. 4, as part of the multi-factor authentication process, the user may enter their cellular phone number, to which the system send a pin number (e.g., by SMS) for the user to verify.

Figure 5:
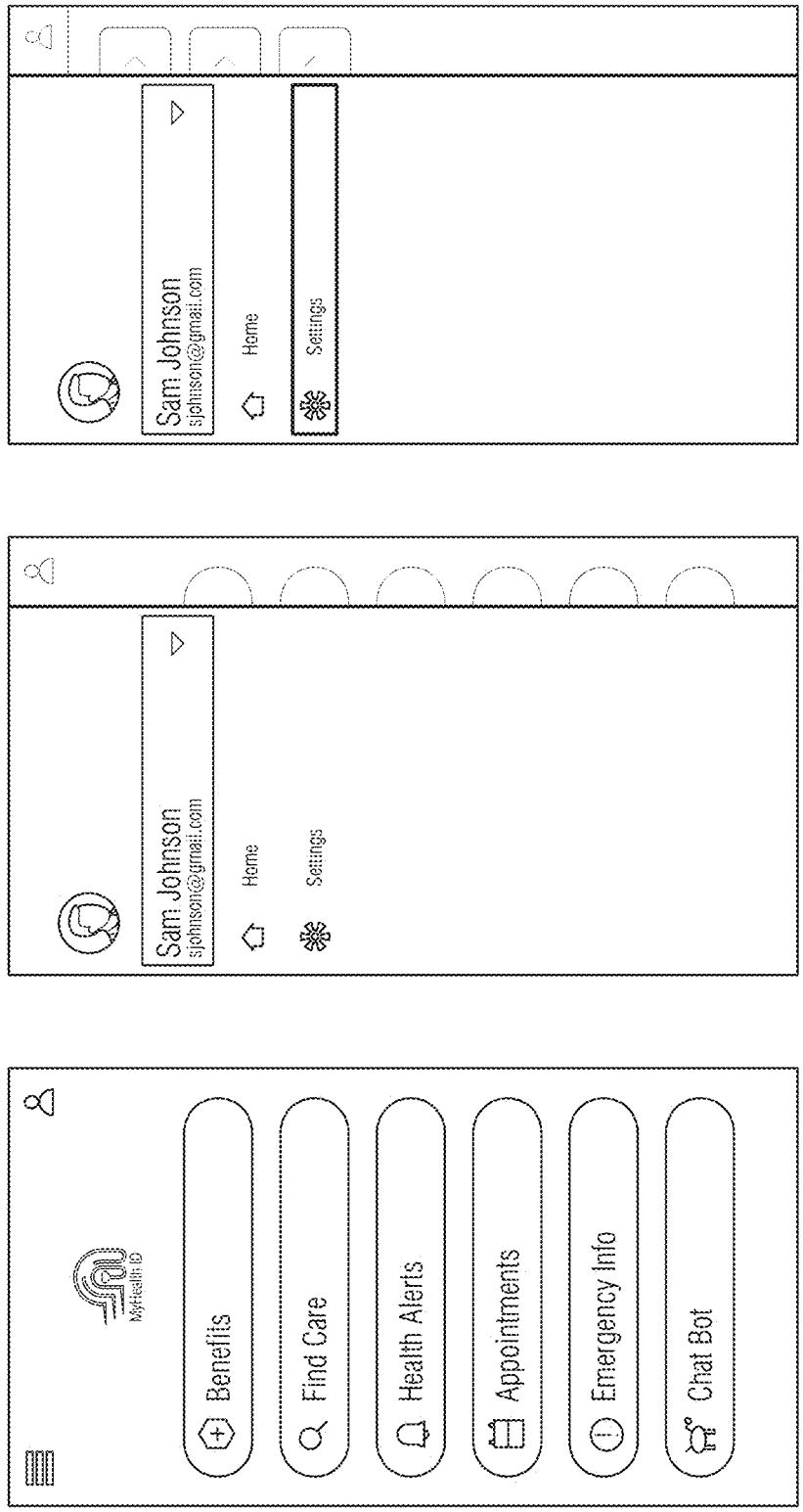
FIG. 5 illustrates an exemplary graphical user interface showing various sections of an app, according to some embodiments of the present disclosure.
Figure 6:
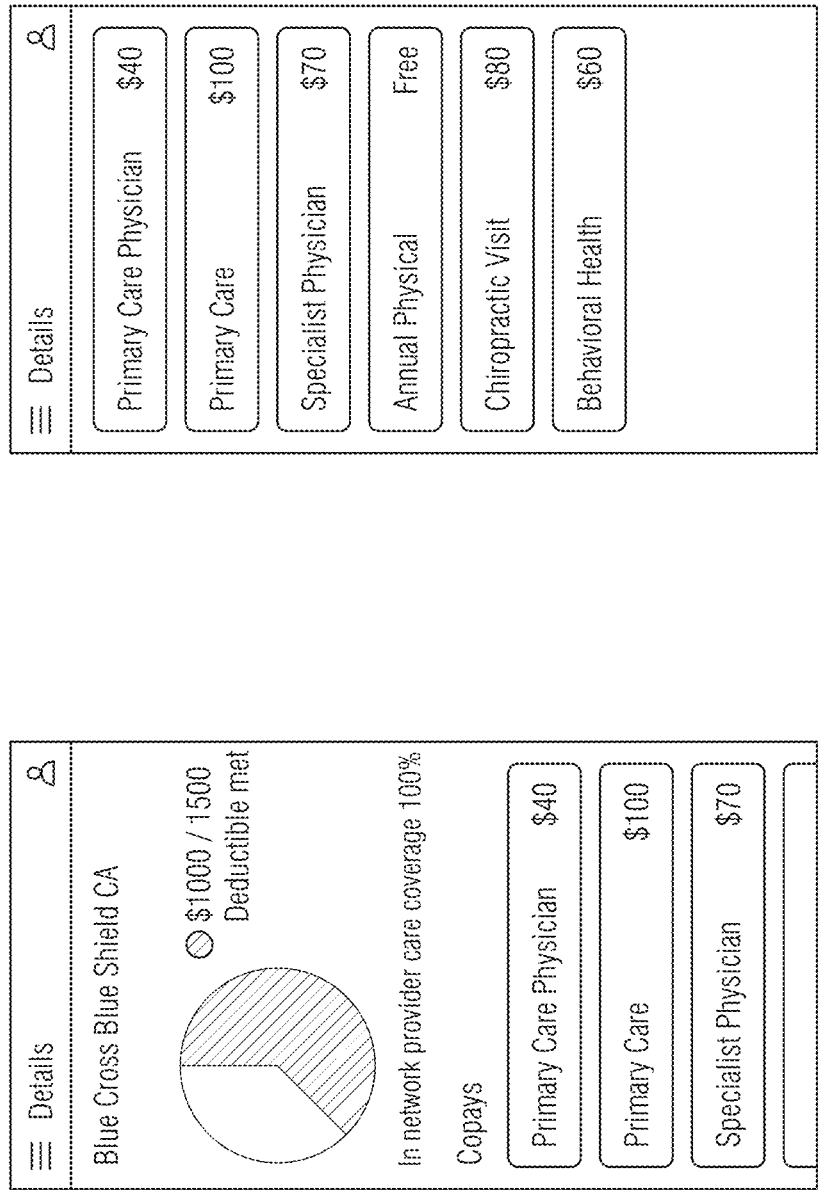
FIG. 6 illustrates an exemplary graphical user interface for detail information pertaining to health insurance eligibility information, according to some embodiments of the present disclosure.

In some embodiments, once phone verification is complete the user may now be able to access each section of the app. FIG. 5 illustrates an exemplary user interface 500 showing various sections of the app, according to some embodiments. The first section, Benefits, as illustrated in the exemplary user interface 600 in FIG. 6, may provide the user with detail information pertaining to his/her health insurance eligibility information, for example, regarding deductible amount, deductible remaining, out of pocket maximum, copay by specialty and other related patient costs.

Figure 7:
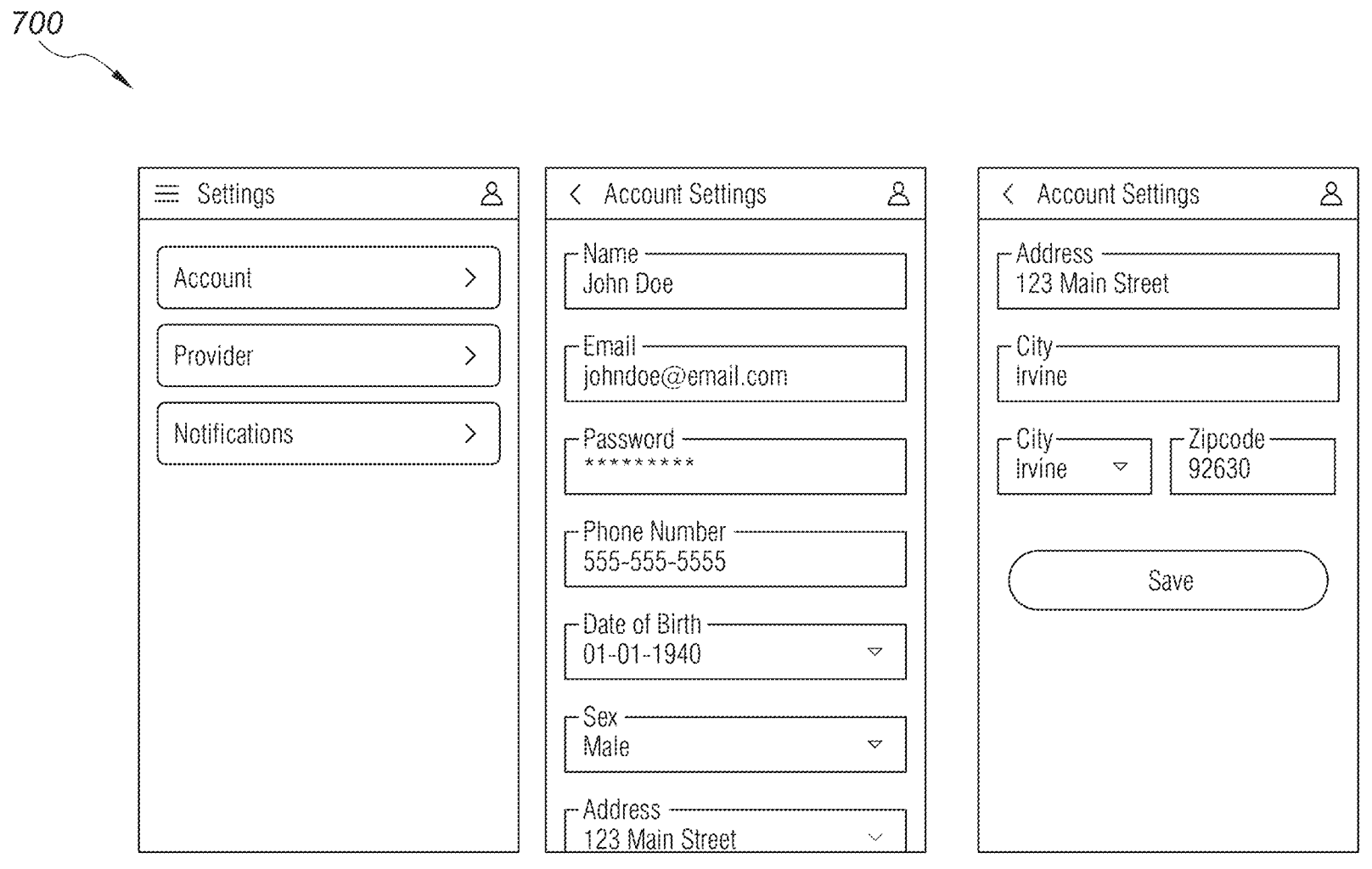
Figure 8:
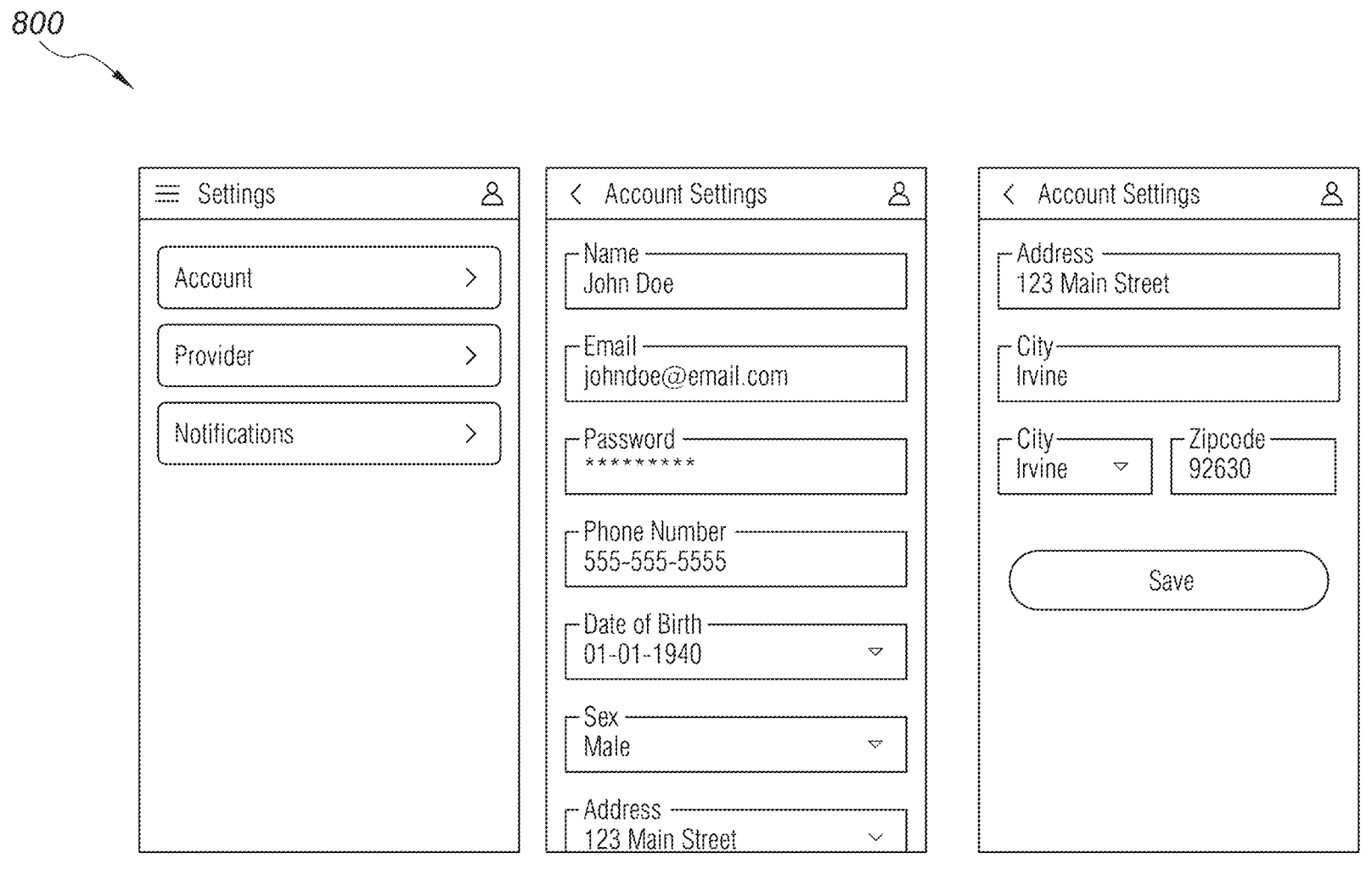

In some embodiments, as illustrated in the exemplary user interface 700 in FIG. 7, under Settings>Account section, the user can update his/her personal information. As illustrated in the exemplary user interface 800 in FIG. 8, under Settings>Provider section, the user can update health insurance information and in the Notification section the user can turn on/off push and email notifications.

Find Care/Booking (with Secure Sharing of Protected Health Information Between Patient and Healthcare Provider)

Figure 9:
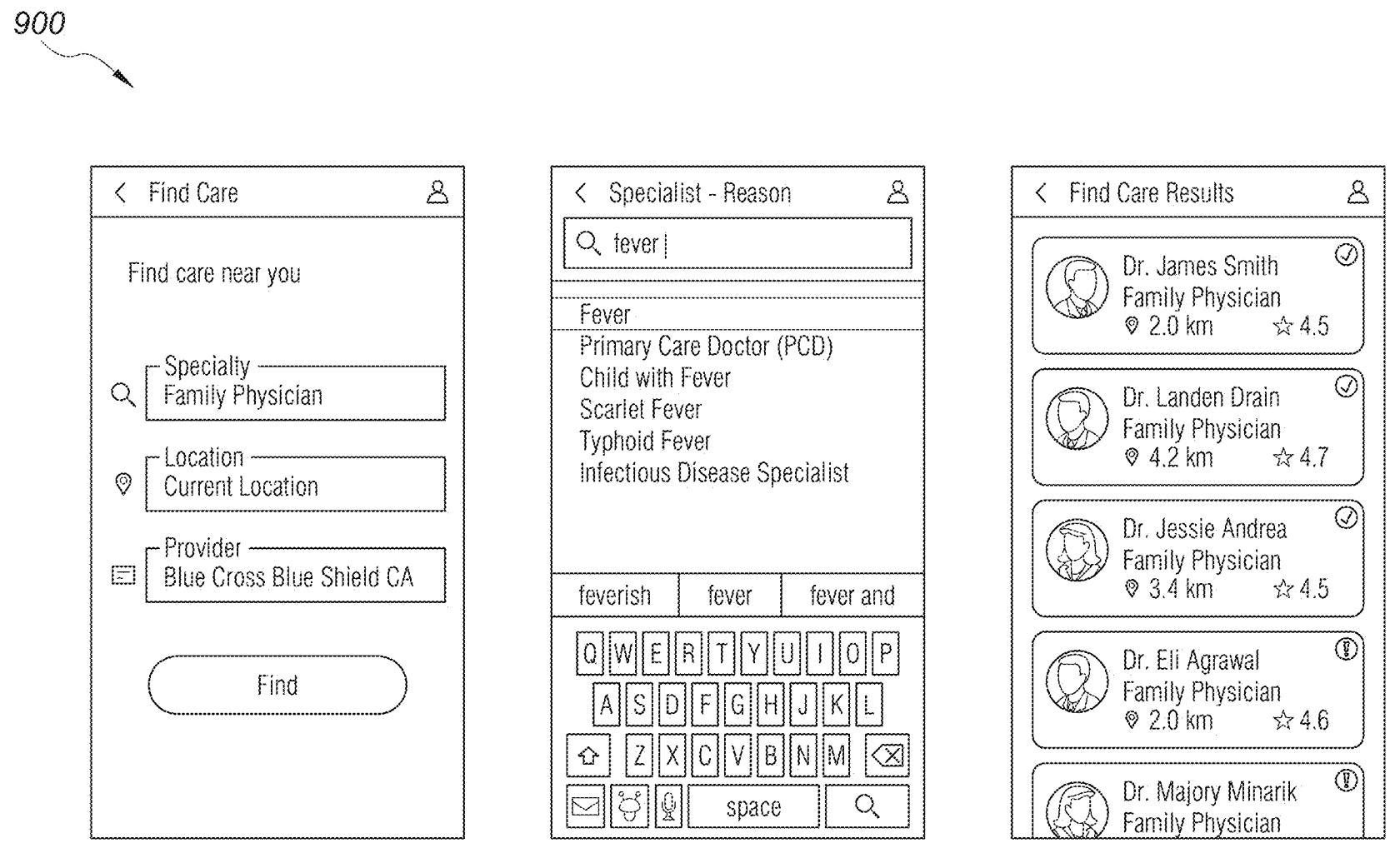
Figure 10:
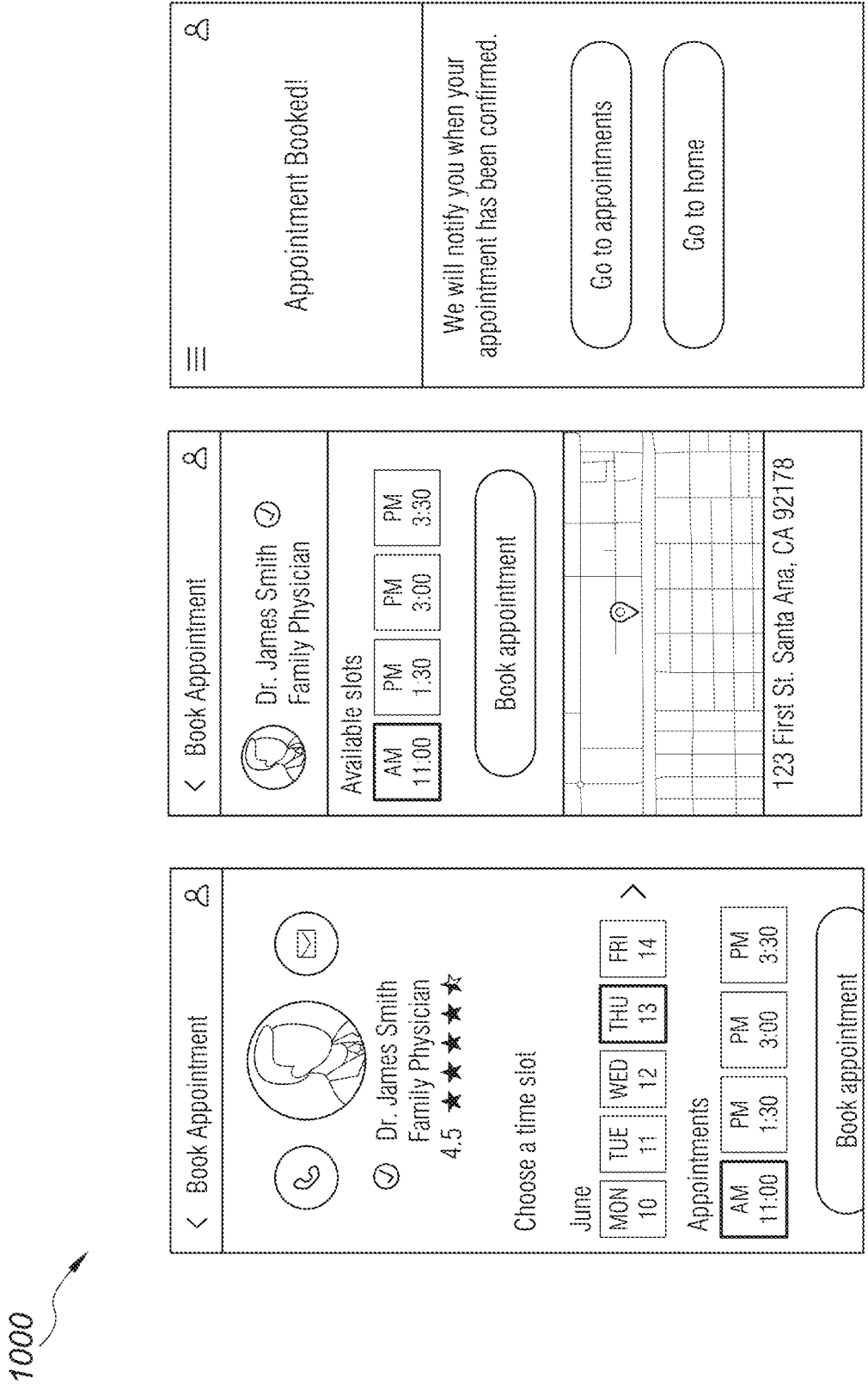
FIG. 10 illustrates an exemplary graphical user interface for select one of several providers, according to some embodiments of the present disclosure.

FIG. 9 illustrates an exemplary user interface 900 showing under the Main Menu>Find Care section, the user can search for a provider in his/her area and the desired specialty. In some embodiments, the app may provide a list of providers with ratings to choose from within the user's coverage network. The user/patient may select one of the providers and, for example, requests an appointment, as illustrated in the exemplary user interface 1000 in FIG. 10.

Figure 23:
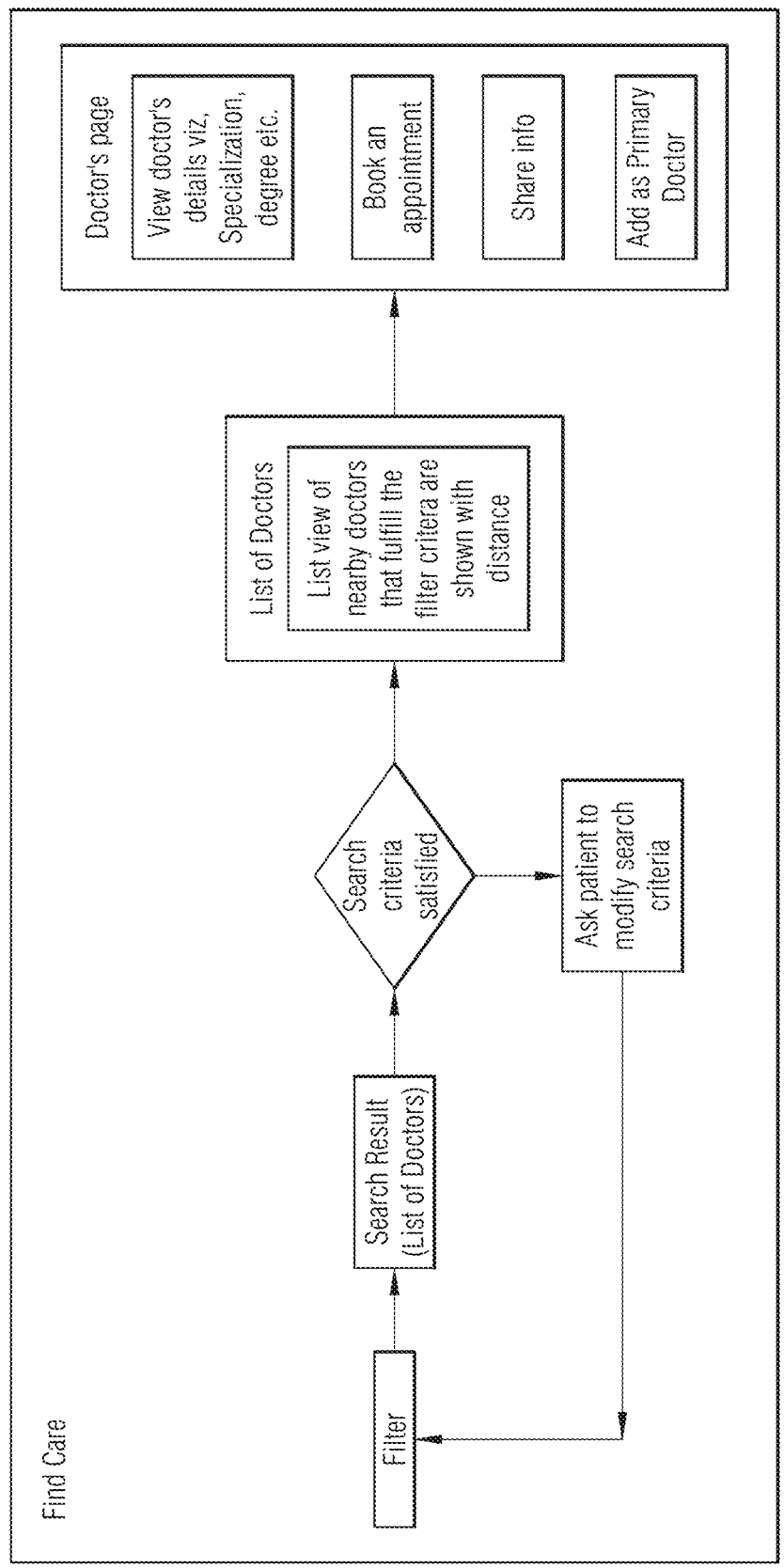
FIG. 23 illustrates an exemplary high-level flow diagram of a find-care process, according to some embodiments of the present disclosure.

FIG. 23 illustrates an example high-level flow diagram 2300 of a Find Care process, according to some embodiments.

Figure 21:
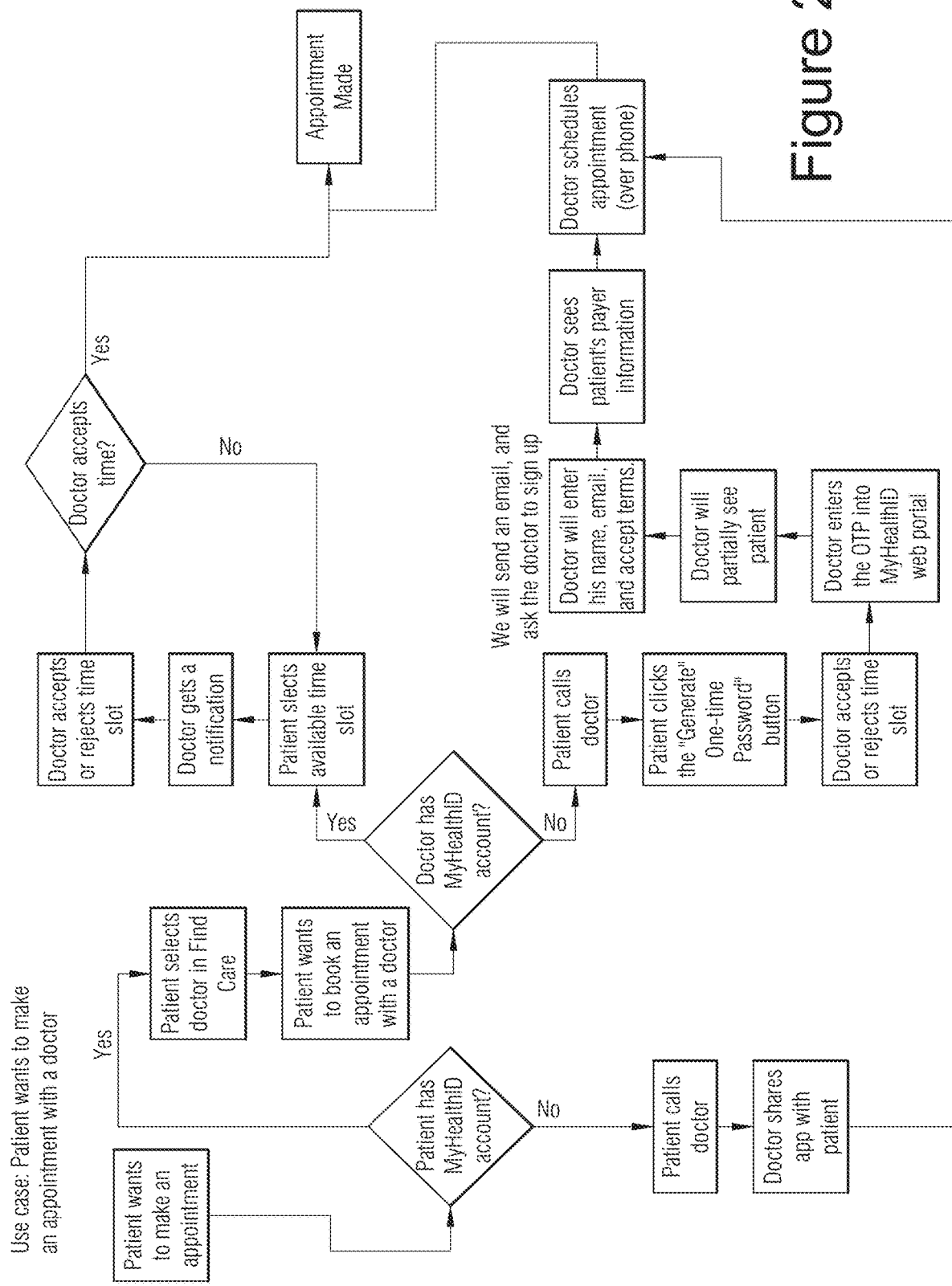
FIG. 21 illustrates an exemplary flow diagram of a patient making an appointment with a provider using MyhealthID app, according to some embodiments of the present disclosure.

FIG. 21 illustrates an exemplary flow diagram of a patient making an appointment with a provider using MyHealthID app, according to some embodiments of the present disclosure.

Figure 11:
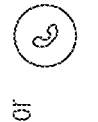
FIG. 11 illustrates an exemplary graphical user interface for One Time Password (OTP), according to some embodiments of the present disclosure.
Figure 12:
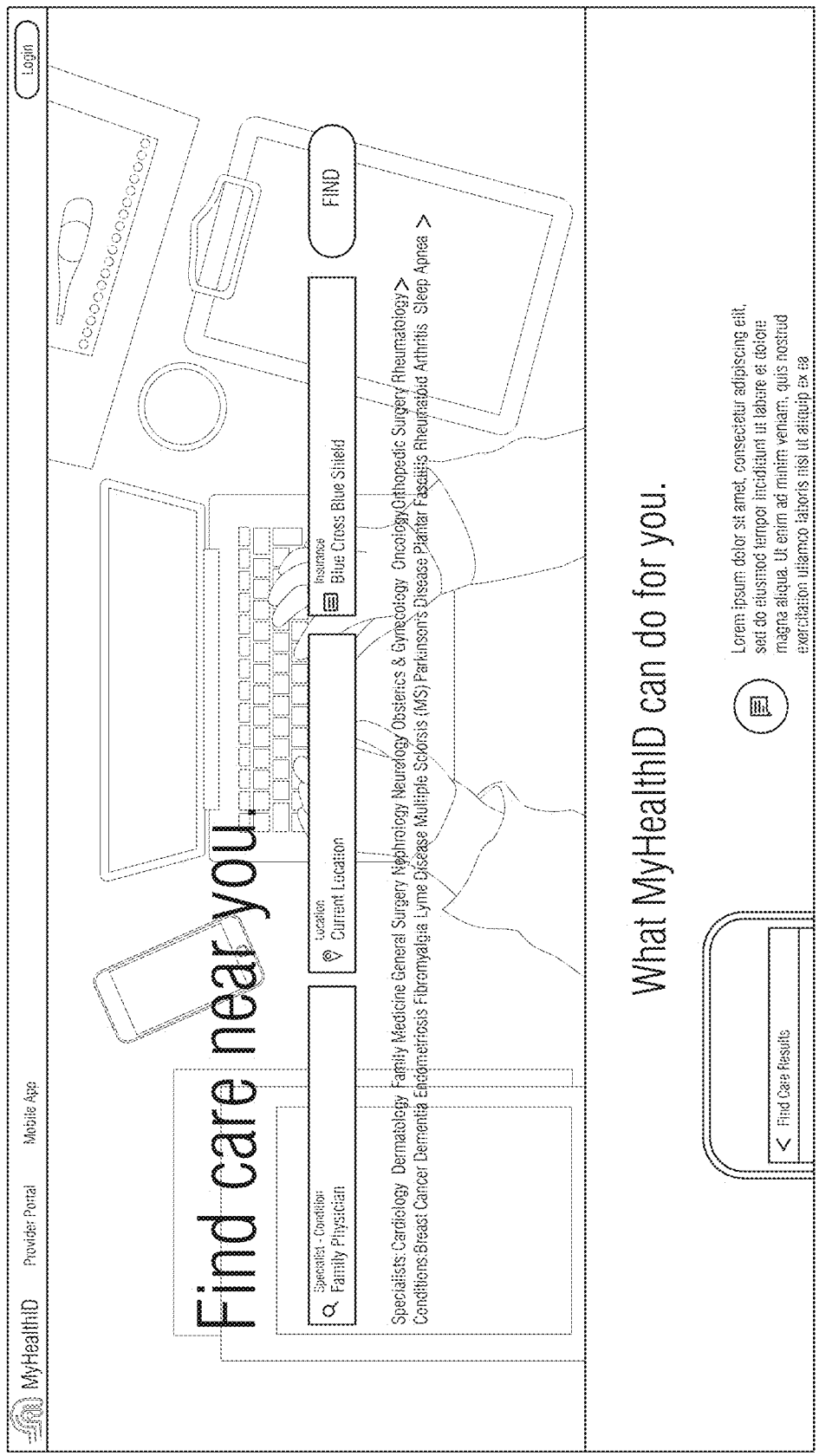

In some applications, some providers may not be able to be booked directly through the app. The user may call the provider directly. However, as illustrated in the exemplary user interface 1100 in FIG. 11, the user can generate a One Time Password (OTP) to share his/her PHI (protected health information) information with the provider. Without a solution like MyHealthID, the doctor's office answering patient's phone has to tediously ask the patient and record lots of data including demographics and healthcare insurance coverage details; this is an error-prone, manual process that leads to downstream insurance denials for the doctor's due to incorrect data that can creep in due to the manual process of data gathering on new patients over the phone; in addition, the patient still has to arrive at the doctor's office at least 15 minutes prior to the actual time of appointment so that the patient can fill out healthcare questionnaire/medical history and take photocopies of patient's driver's license and health insurance card. All that may be solved by MyHealthID' s patient initiated, OTP driven, one-time/limited time access process that lets the doctor's office access and download all the patient data needed for patient registration, for example: copies of insurance card and driver's license card, eligibility data and if needed, any patient history data instantly. Patients who use MyHealthID for initial visit with a new physician may not have to wait for 15 minutes in the waiting room since they were able to provide most of the information remotely. The provider may then log in at a predetermined website (e.g., www.myhealthid.net) to gain access to the patient's (user) personal, health, and insurance information included images of their insurance card and drivers' license as needed for patient registration process.

FIGS. 12, 13, 14, and 15 illustrate more exemplary user interfaces for providers, according to some embodiments.

Figure 13:
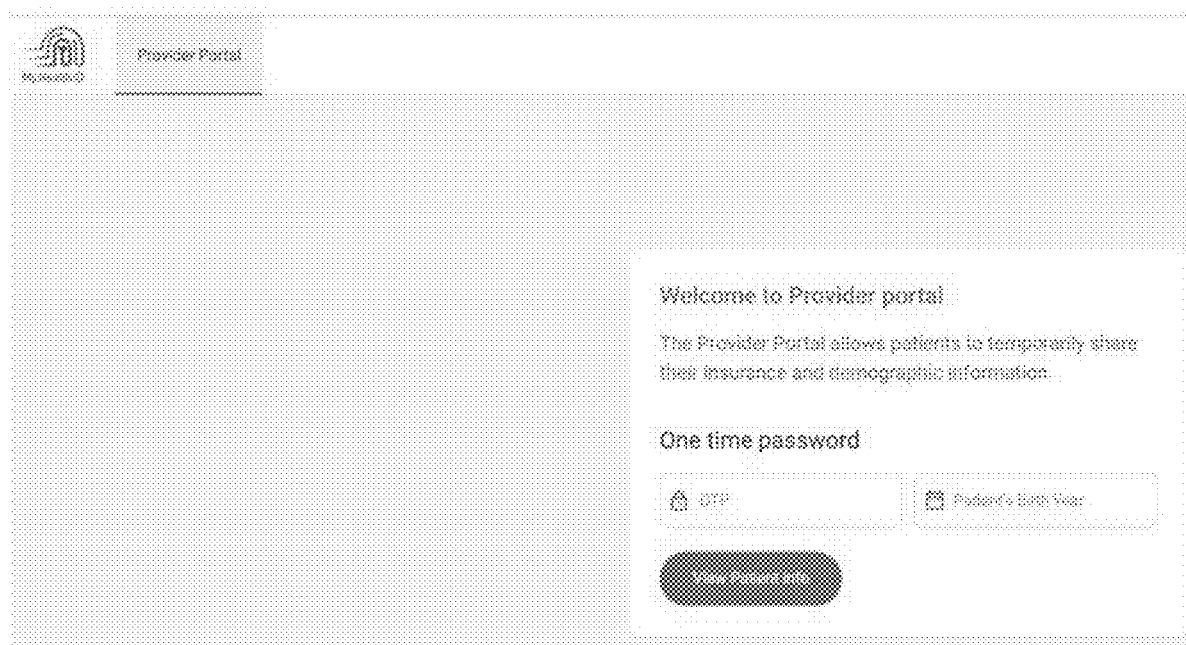
Figure 14:
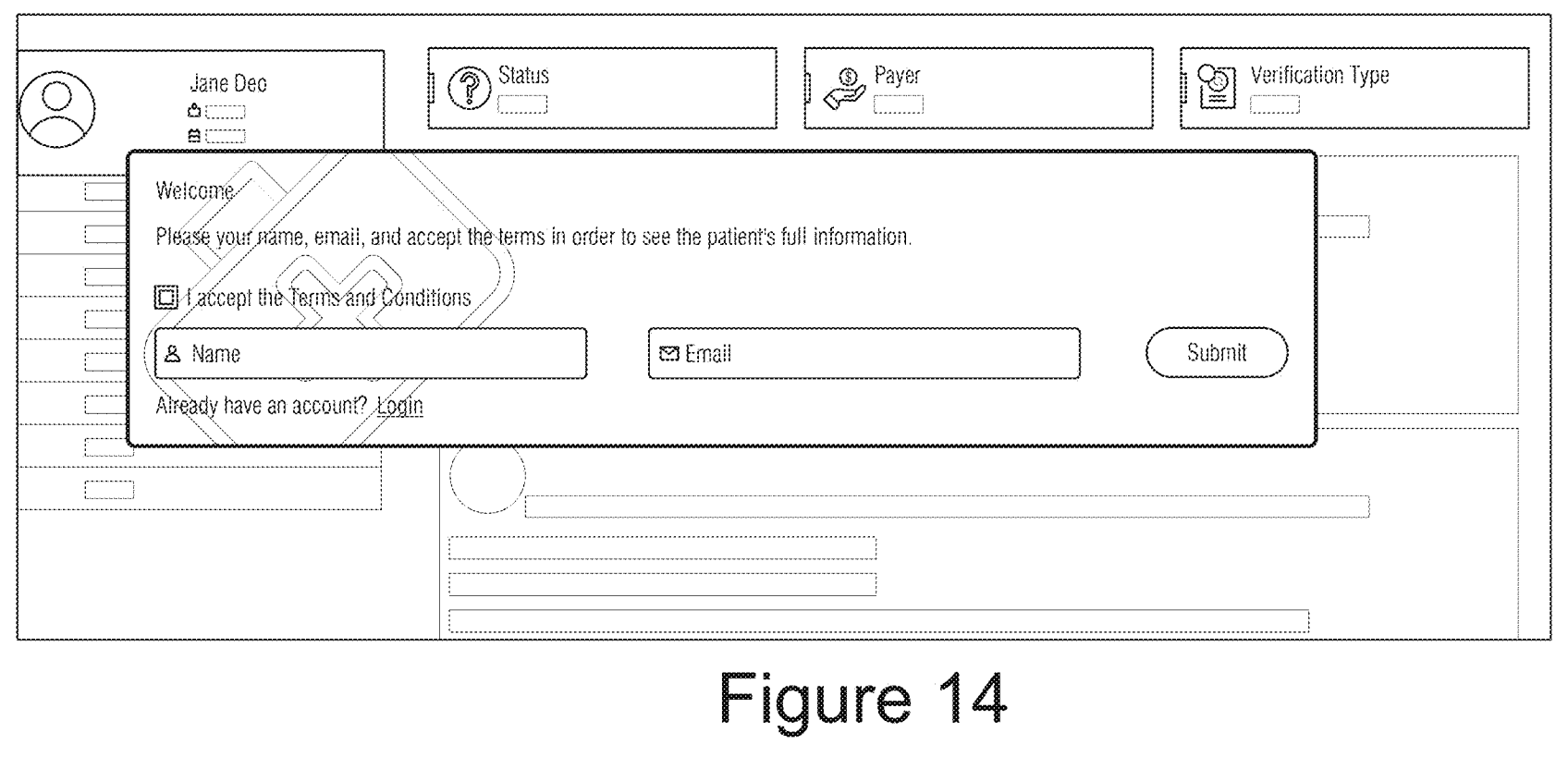
Figure 15:
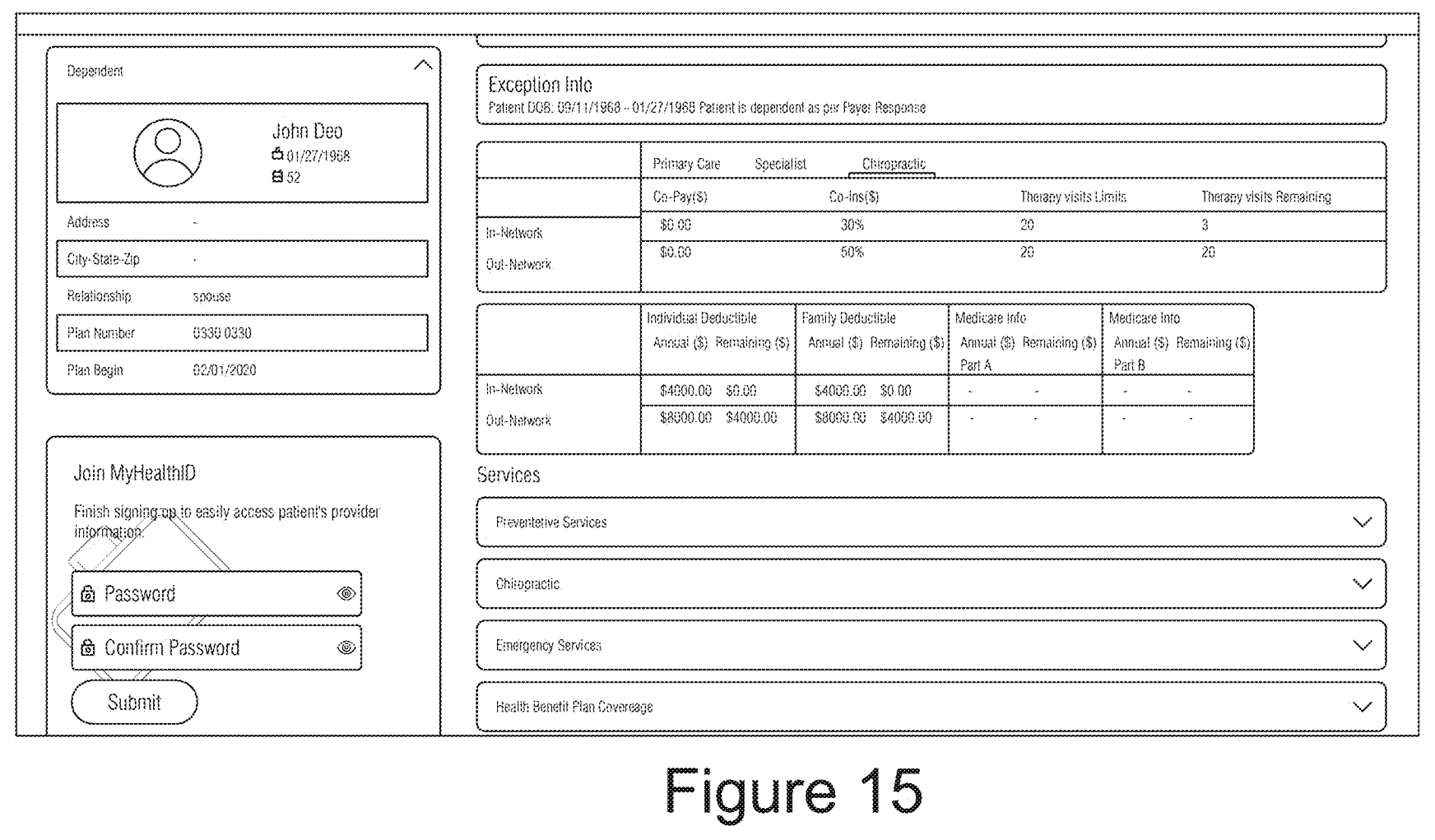

In some embodiments, a provider may go to a web site to enter the OTP and the patient's (user) date of birth to access and download information (FIGS. 13 and 14). Once the provider is granted access, he/she may have the option to join MyHealthID. By joining, the provider can search for a patient and request access. The providers save time and money by not needing to have staff manually enter by hand the information that is downloaded from MyHealthID (FIG. 15).

Figure 16:
FIG. 16 illustrates an exemplary graphical user interface for viewing upcoming and past appointments, according to some embodiments of the present disclosure.

In some embodiments, as illustrated in the exemplary user interface 1600 in FIG. 16, the user may view upcoming and past appointments. For example, at Main Menu>Appointment section, detail of upcoming and past appoints can be viewed. Upcoming appointments can be reviewed, added to a calendar, or cancelled.

Figure 24:
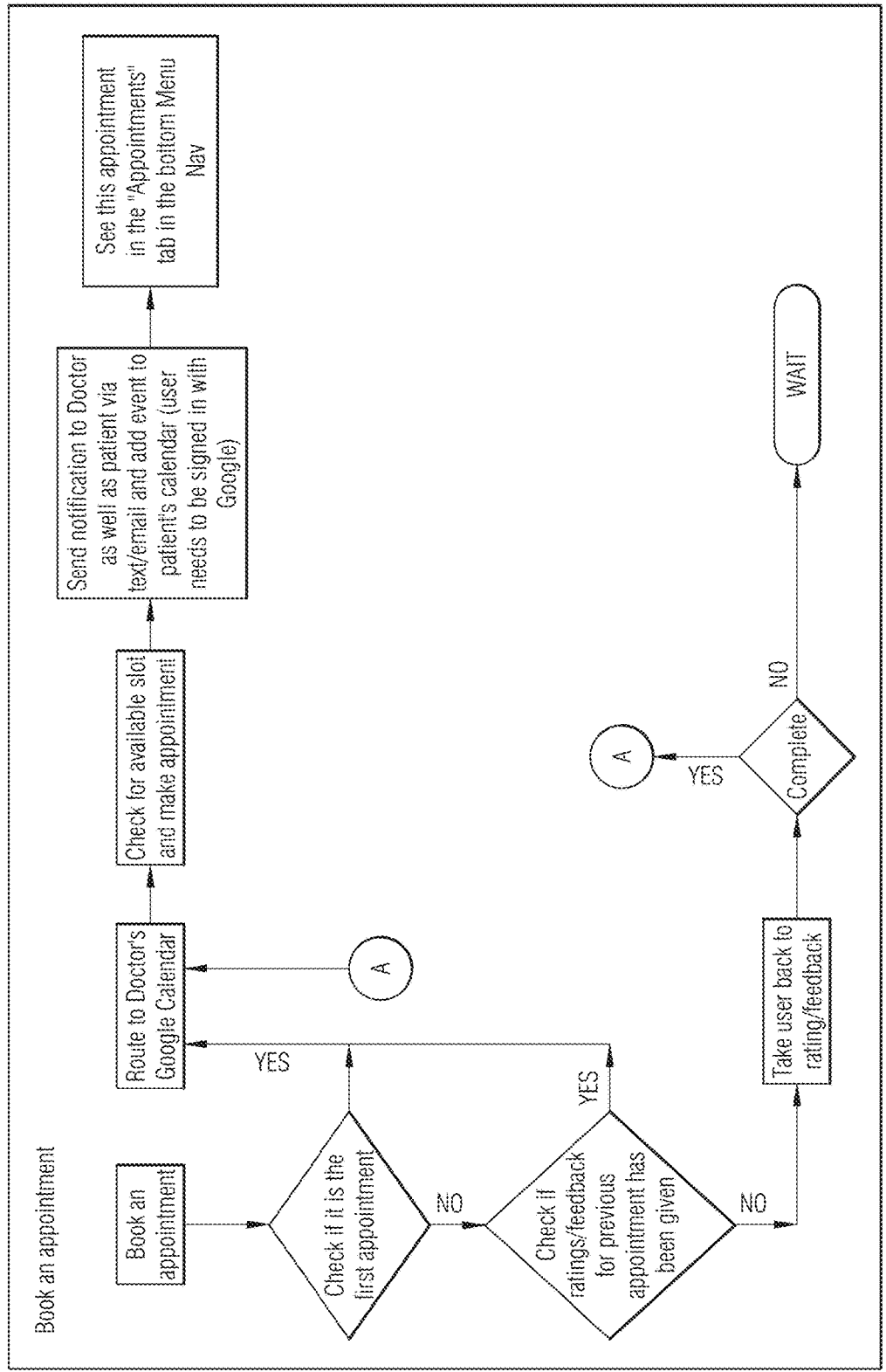
FIG. 24 illustrates an exemplary high-level flow diagram of a booking process, according to some embodiments of the present disclosure.

FIG. 24 illustrates an example high-level flow diagram of a Booking process 2400, according to some embodiments.

Other Services

Figure 17:
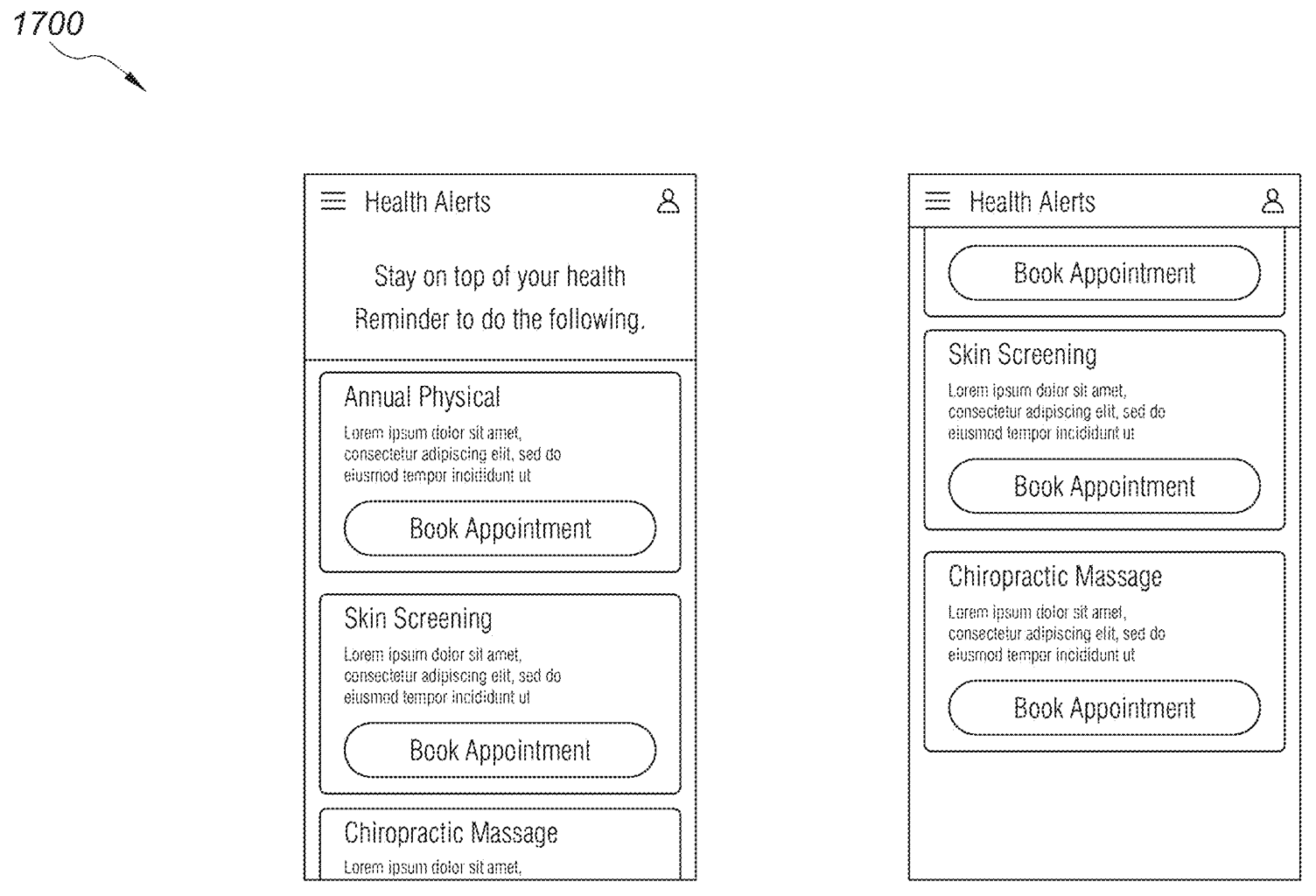
Figure 18:
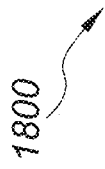
FIG. 18 illustrates an exemplary graphical user interface for an Emergency information section, according to some embodiments of the present disclosure.

In some embodiments, a Health Alerts section provides reminders, e.g., for preventive care services, educational information about each service, as illustrated in the exemplary user interface 1700 in FIG. 17. The Emergency information section lists the user's medical and allergy information along with their emergency contact info, as illustrated in the exemplary user interface 1800 in FIG. 18.

Figure 19:
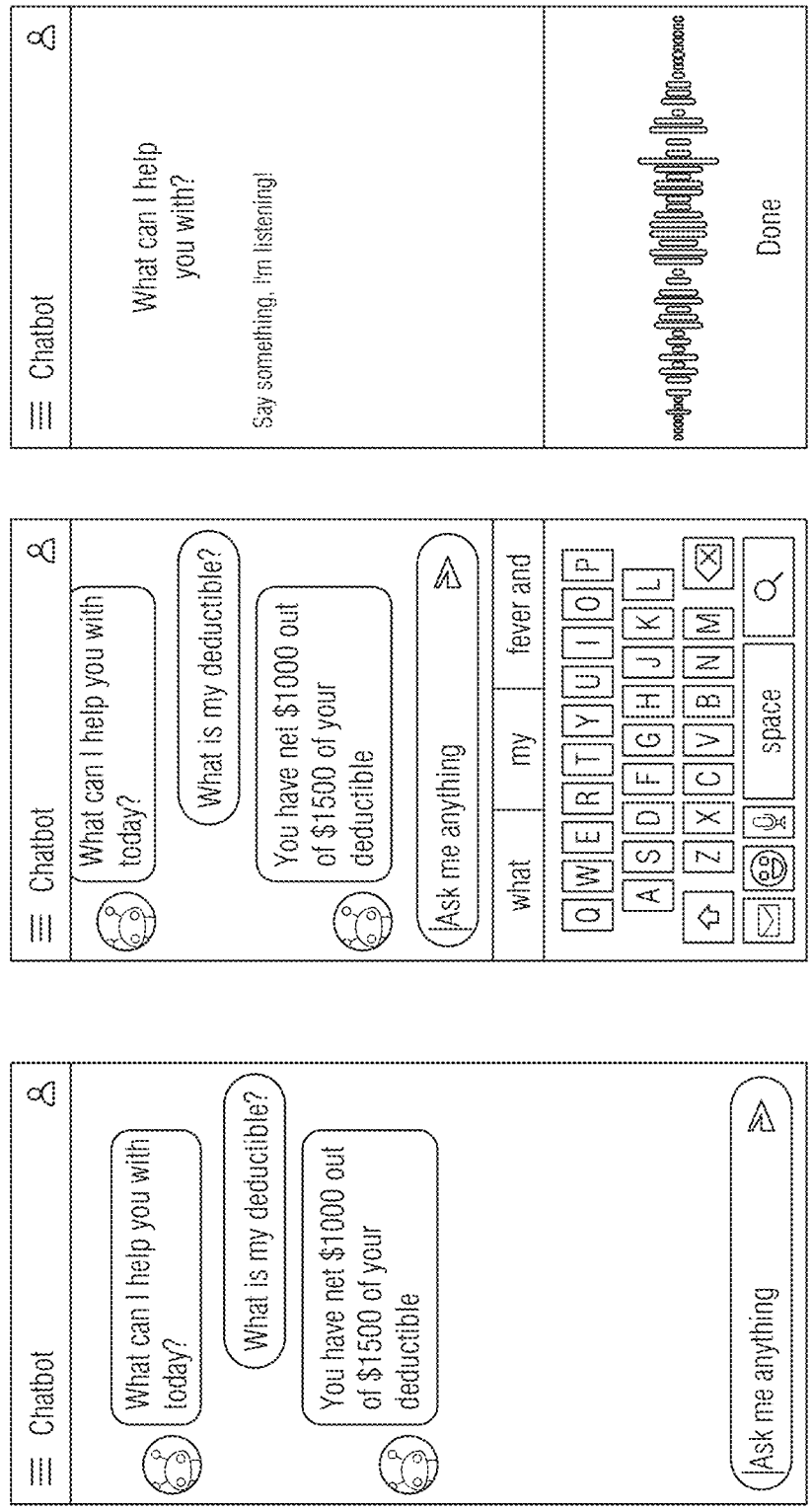
FIG. 19 illustrates an exemplary graphical user interface for a chatbot, according to some embodiments of the present disclosure.
Figure 20A:
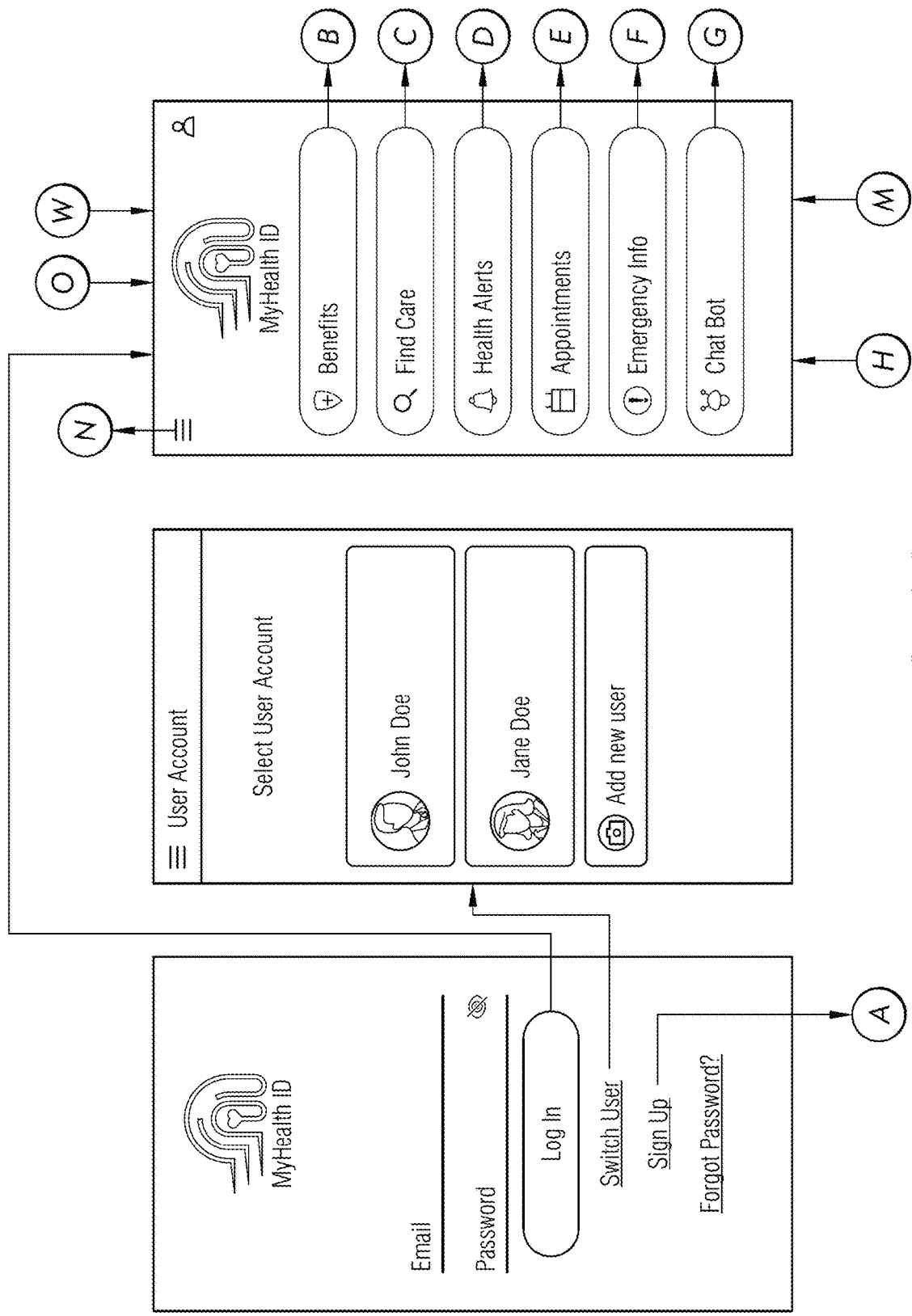
FIGS. 20A to 20L illustrate an exemplary chart of various user interfaces, according to some embodiments of the present disclosure.
Figure 20B:
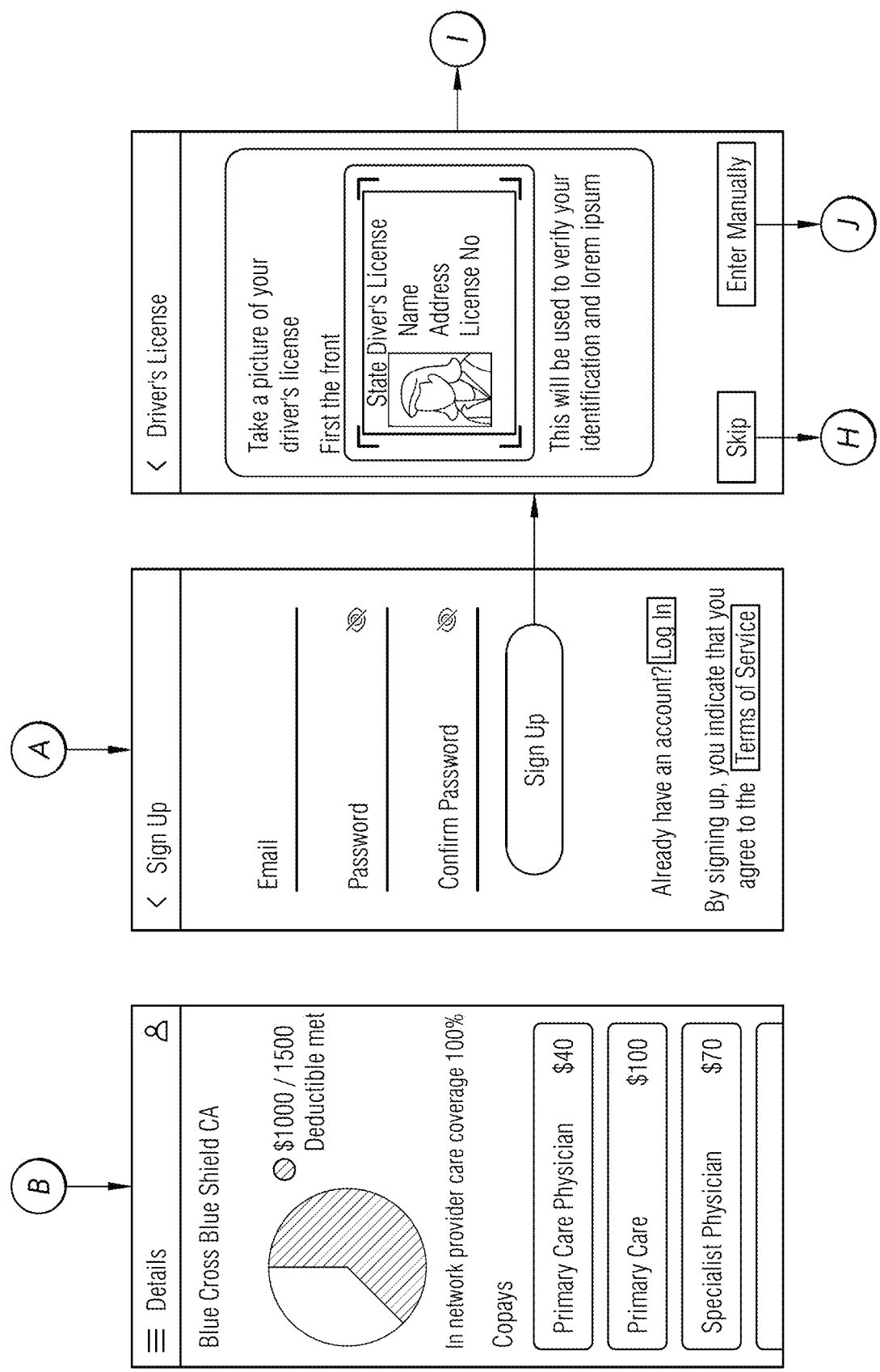
Figure 20C:
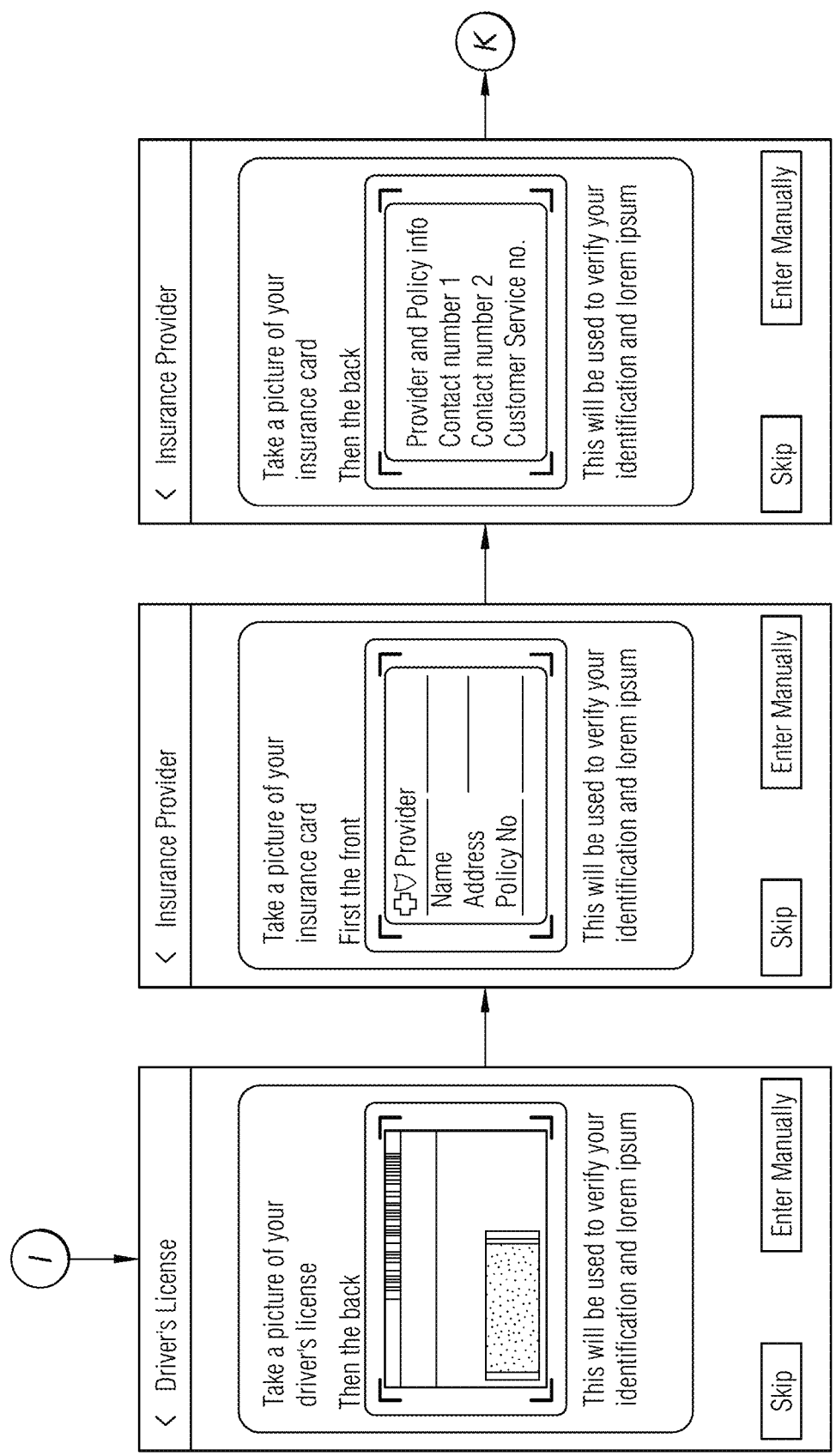
Figure 20D:
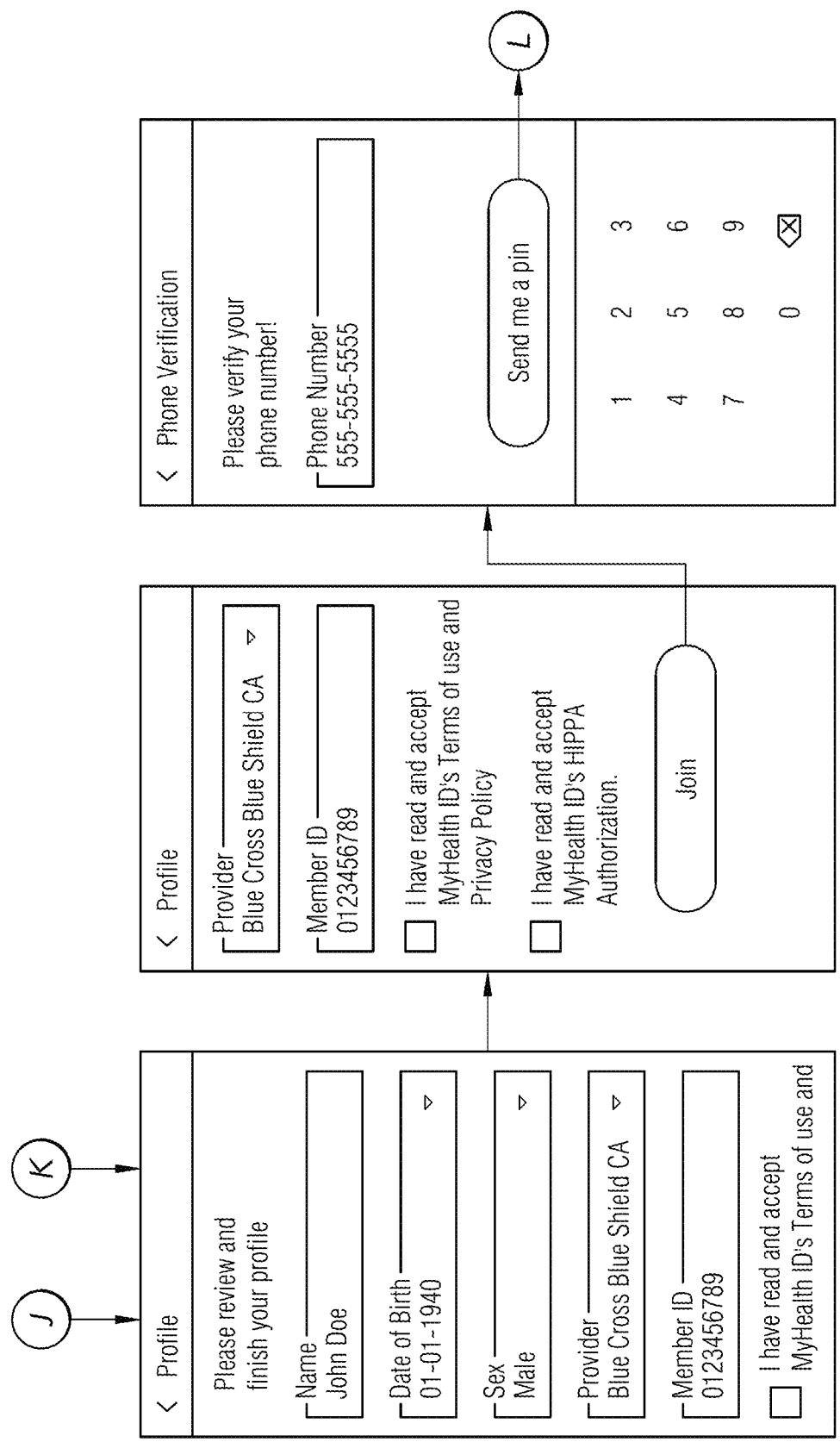
Figure 20E:
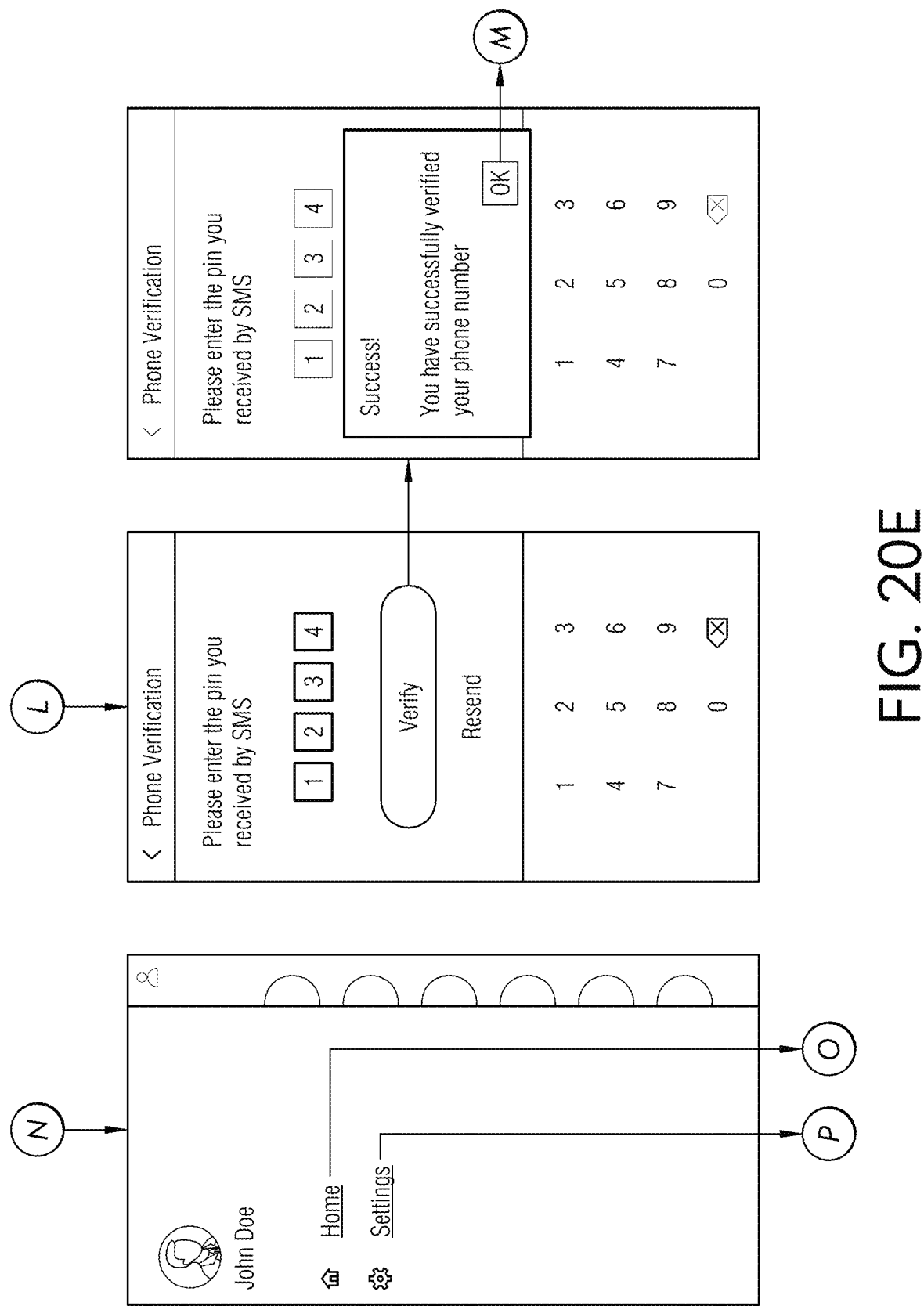
Figure 20F:
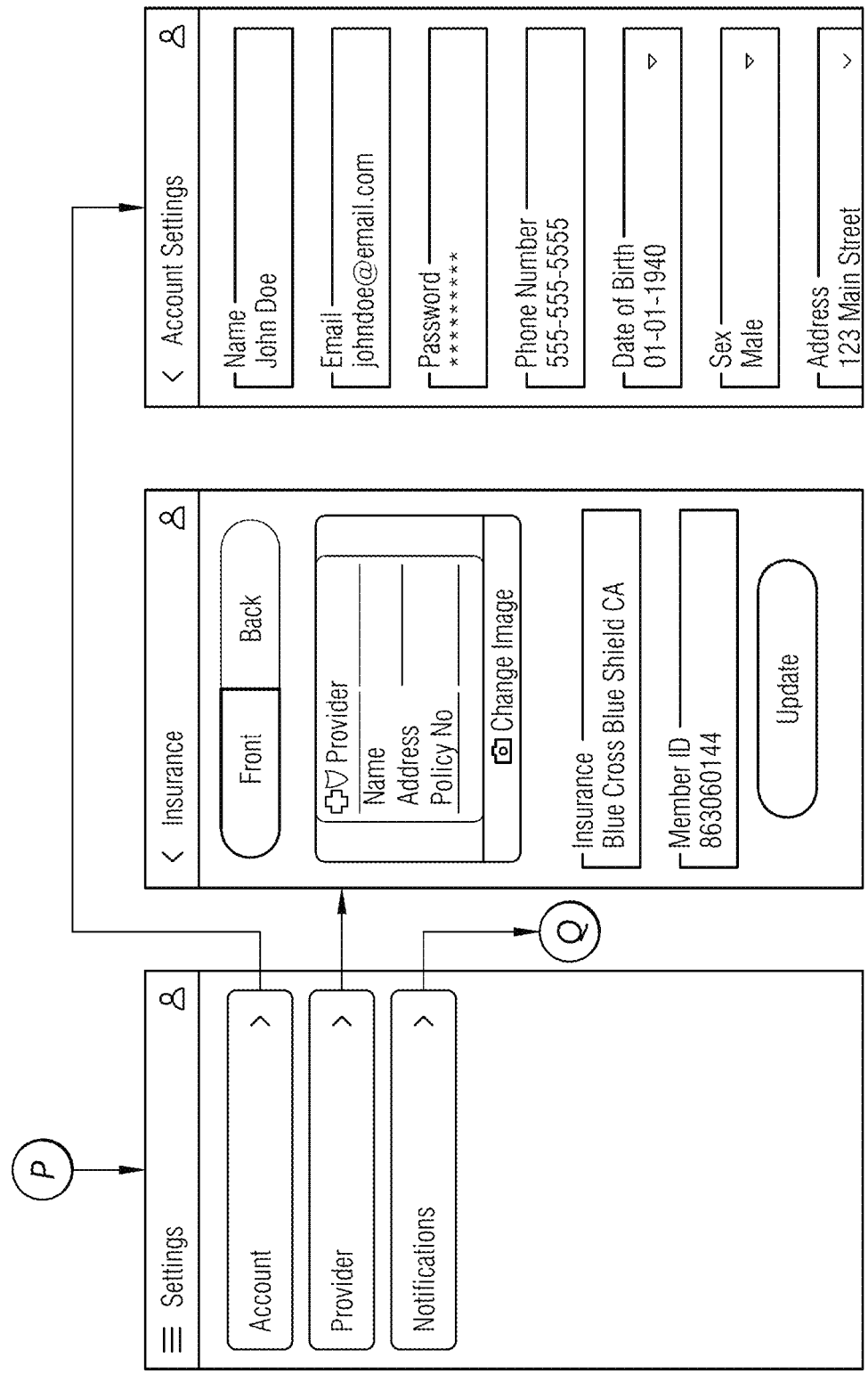
Figure 20G:
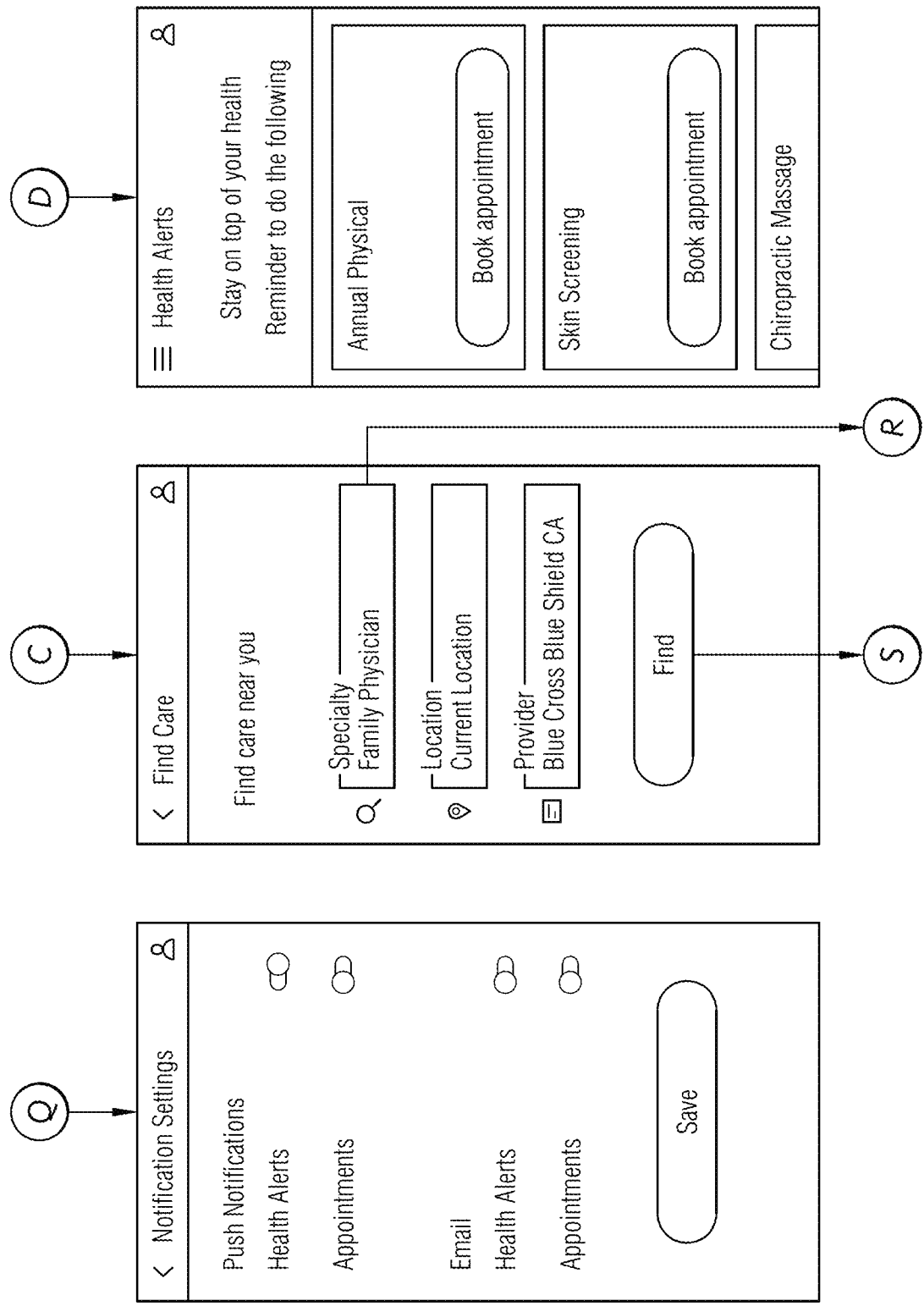
Figure 20H:
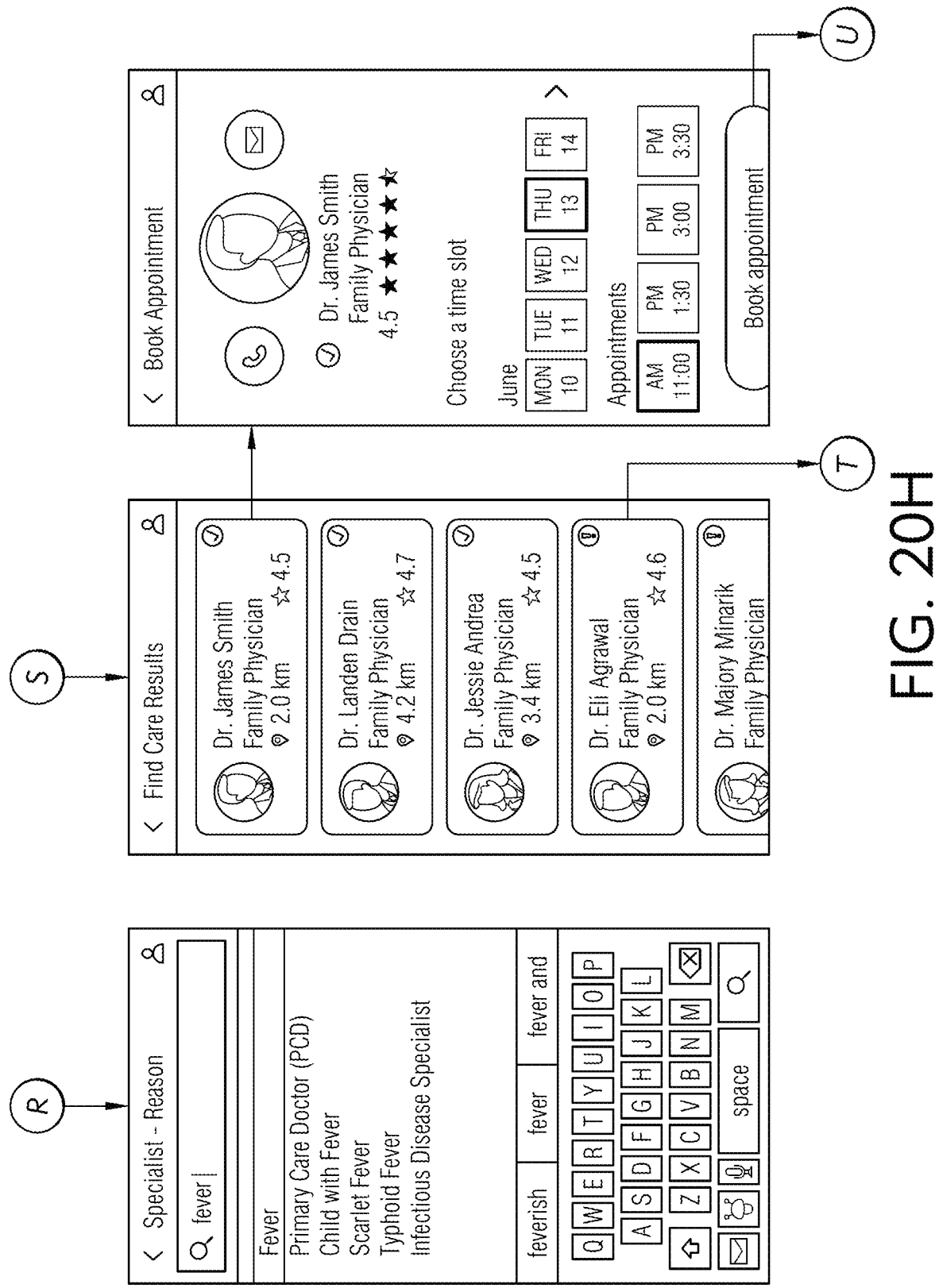
Figure 20I:
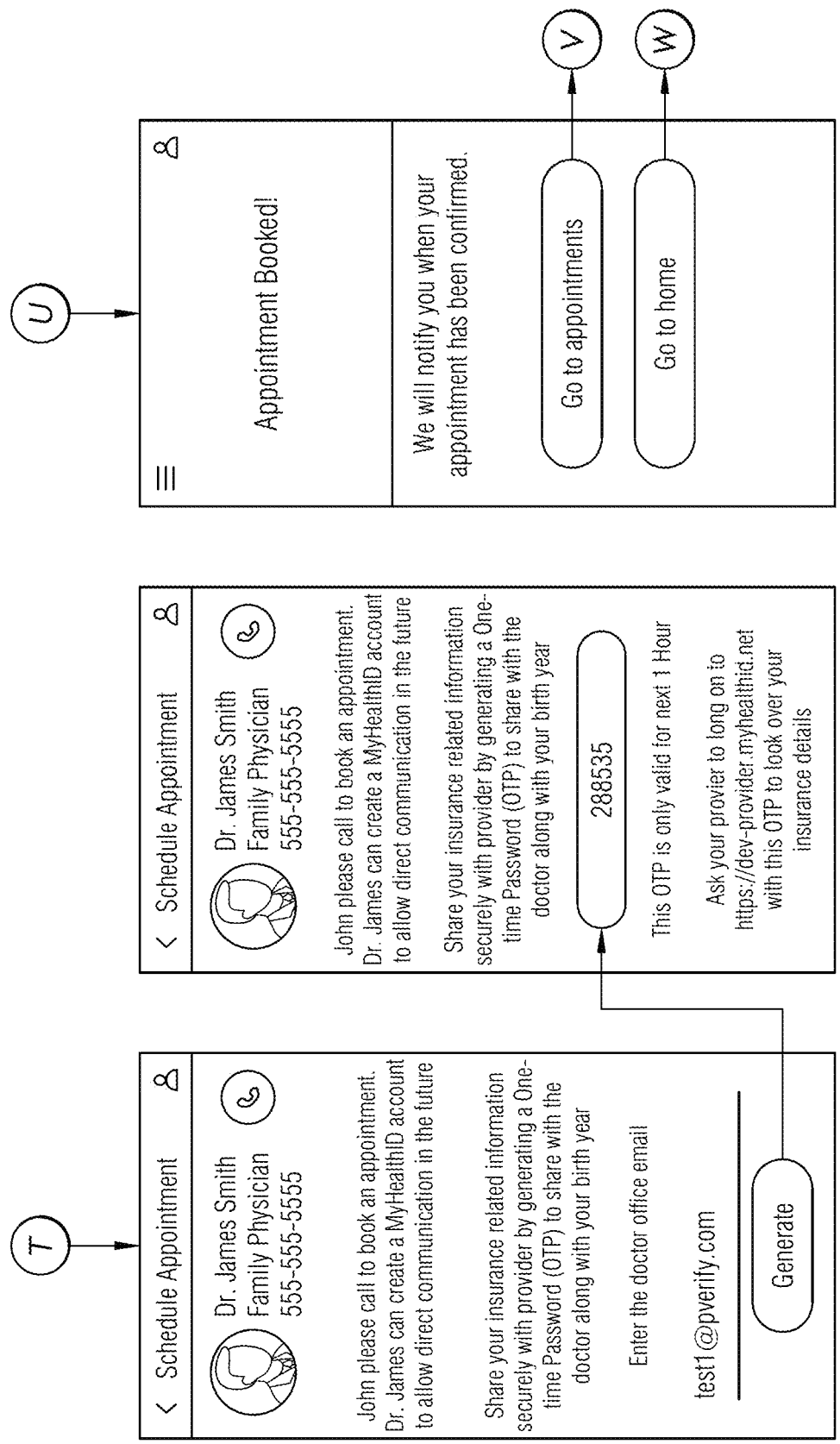
Figure 20J:
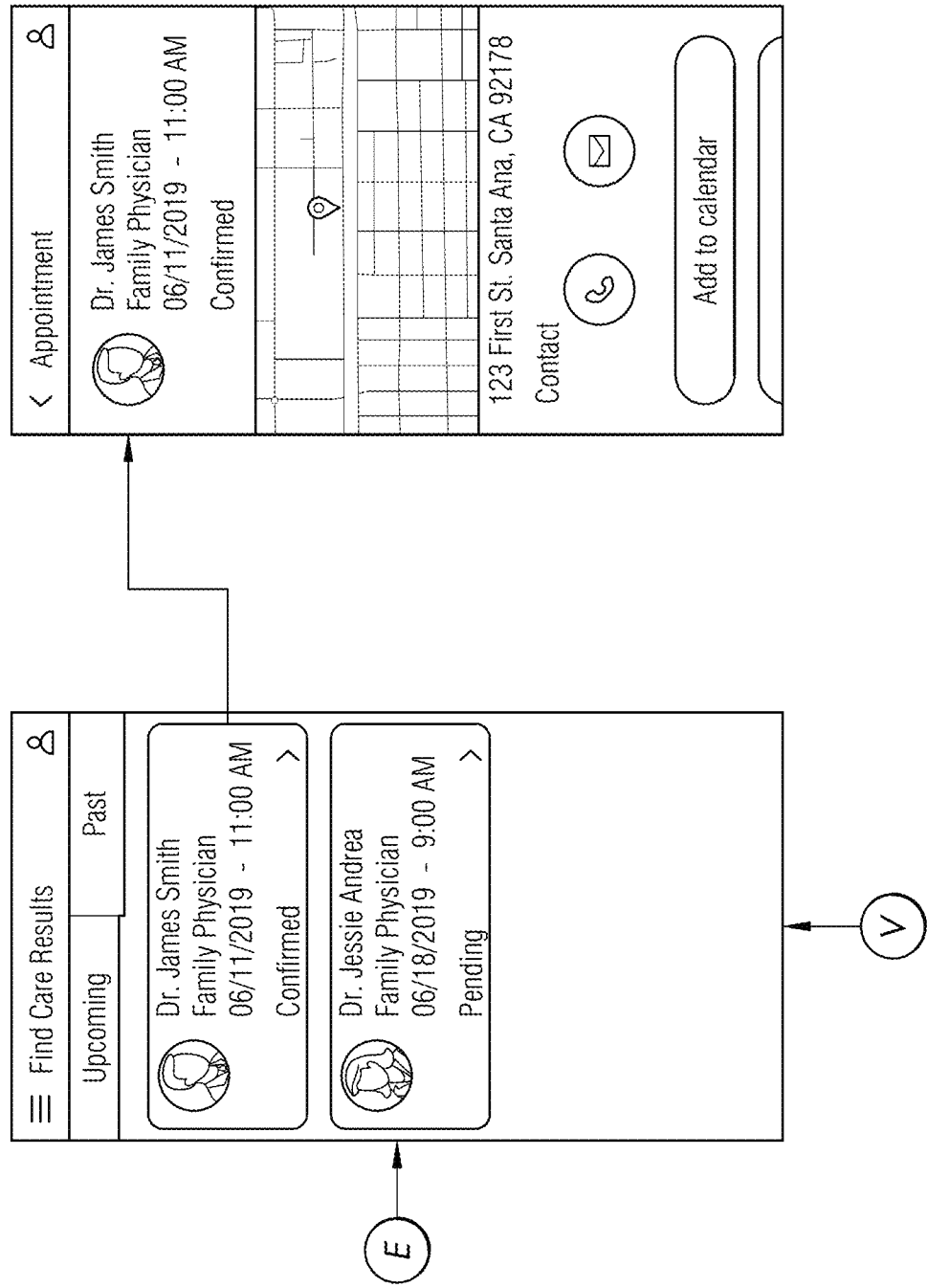
Figure 20K:
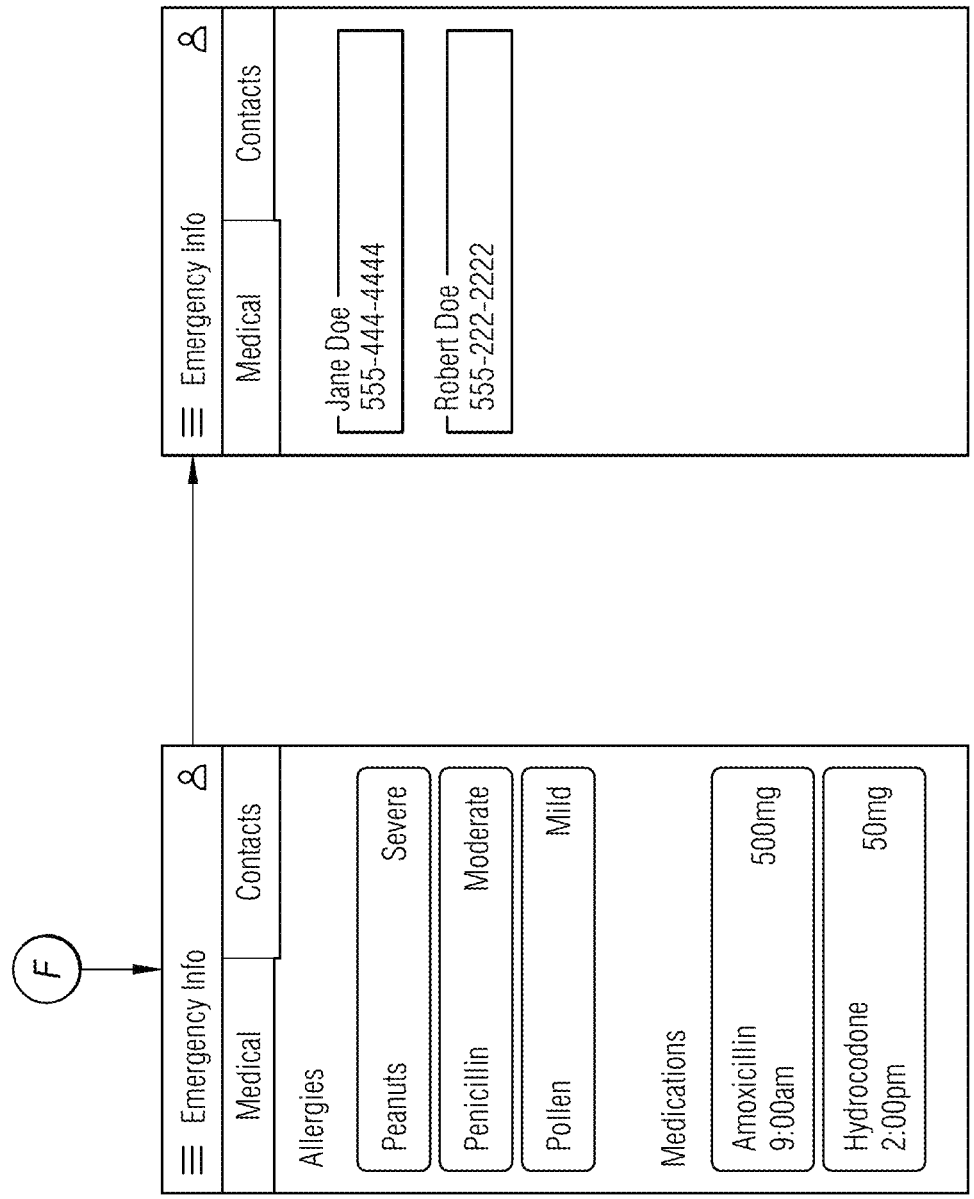
Figure 20L:
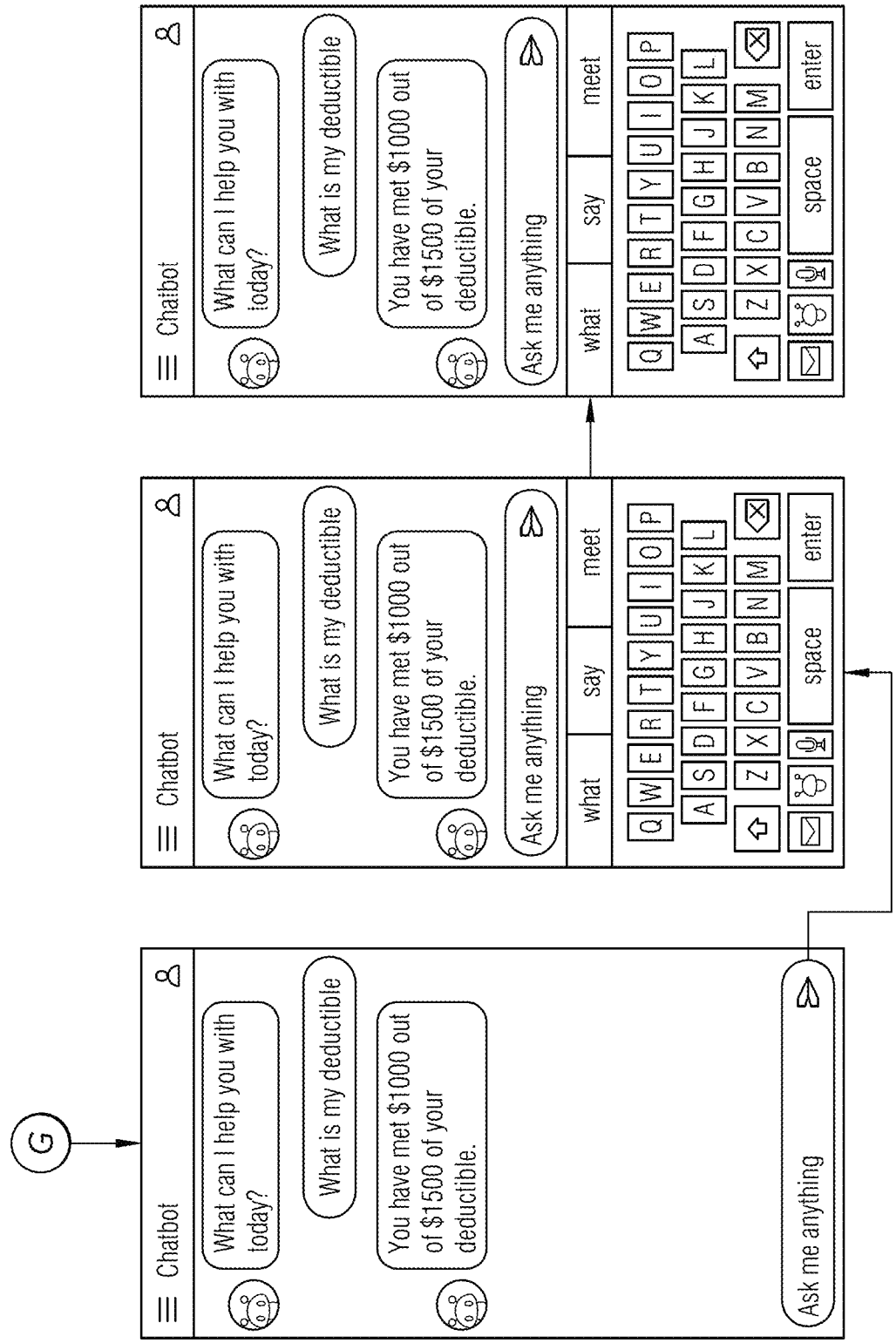

In some embodiments, as illustrated in the exemplary user interface 1900 in FIG. 19, a chatbot may be provided. For example, at Main Menu>Chatbot is a text or voice interface to allow the user to get benefits information instead of having to navigate the various screens within MyHealthID app.

FIGS. 20A to 20L illustrate an exemplary summary chart of various user interfaces described herein and above, according to some embodiments of the present disclosure.

Figure 25:
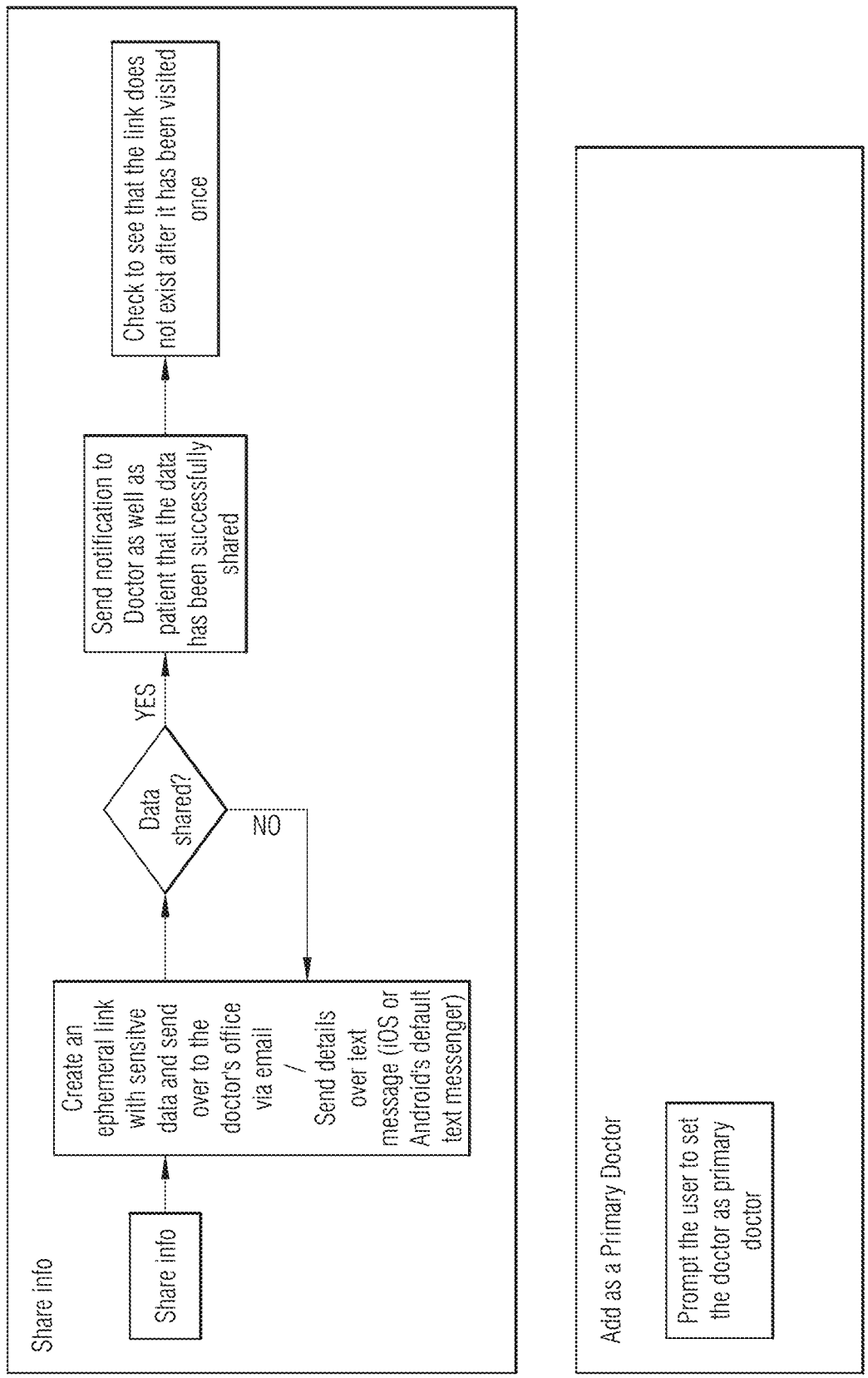
FIG. 25 illustrates an exemplary high-level flow diagram of a share-info process, according to some embodiments of the present disclosure.

FIG. 25 illustrates an exemplary high-level flow diagram of a share-info process, according to some embodiments of the present disclosure.

Figure 26:
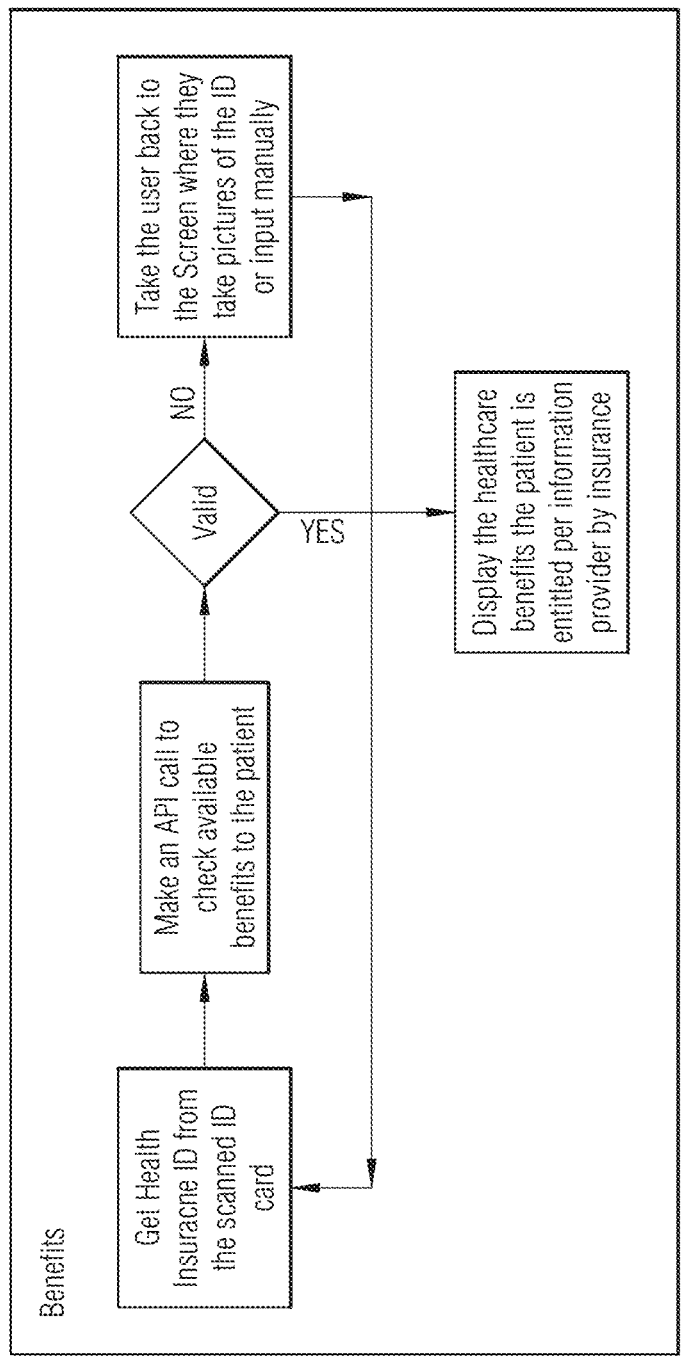
FIG. 26 illustrates an exemplary high-level flow diagram of a benefits retrieval and viewing process, according to some embodiments of the present disclosure.

FIG. 26 illustrates an exemplary high-level flow diagram of a benefits retrieval and viewing process, according to some embodiments of the present disclosure.

Figure 27:
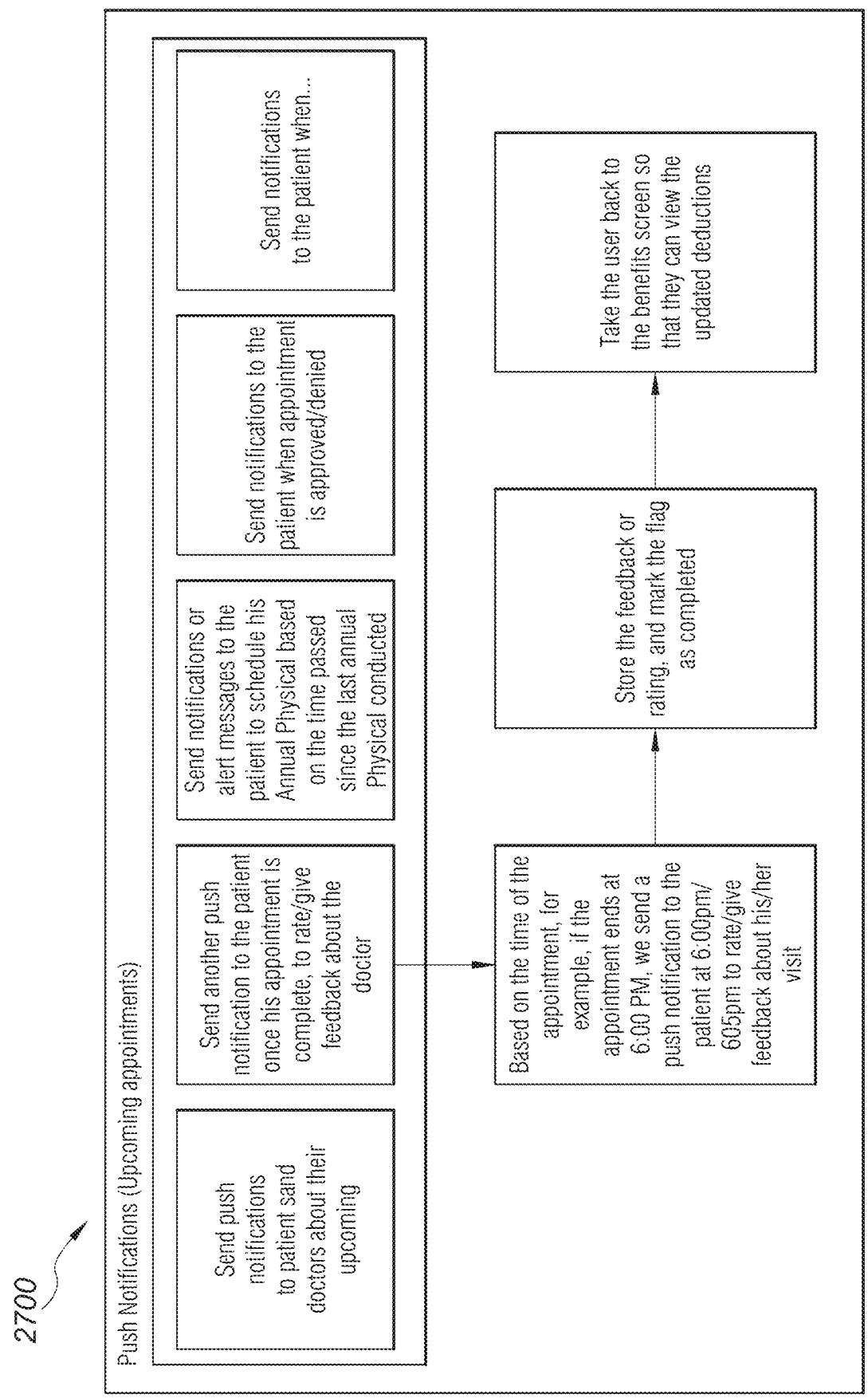
FIG. 27 illustrates an exemplary high-level flow diagram of a Push Notification process, according to some embodiments of the present disclosure.

FIG. 27 illustrates an example high-level flow diagram 2700 of a Push Notification process, according to some embodiments.

In some embodiments, MyHealthID may also include personalized smartphone nudges, e.g., based on medical conditions, gender, age, race, etc. and as per CDC or Medicare recommended guidelines, health monitoring and activity tracking integration: user input, Fitbit™, MyFitnessPal™, Apple health™, KardiaBand™, Owlet™, and other health monitoring devices (glucose meters, blood pressure, oxygen meters, etc.).

Figure 28:
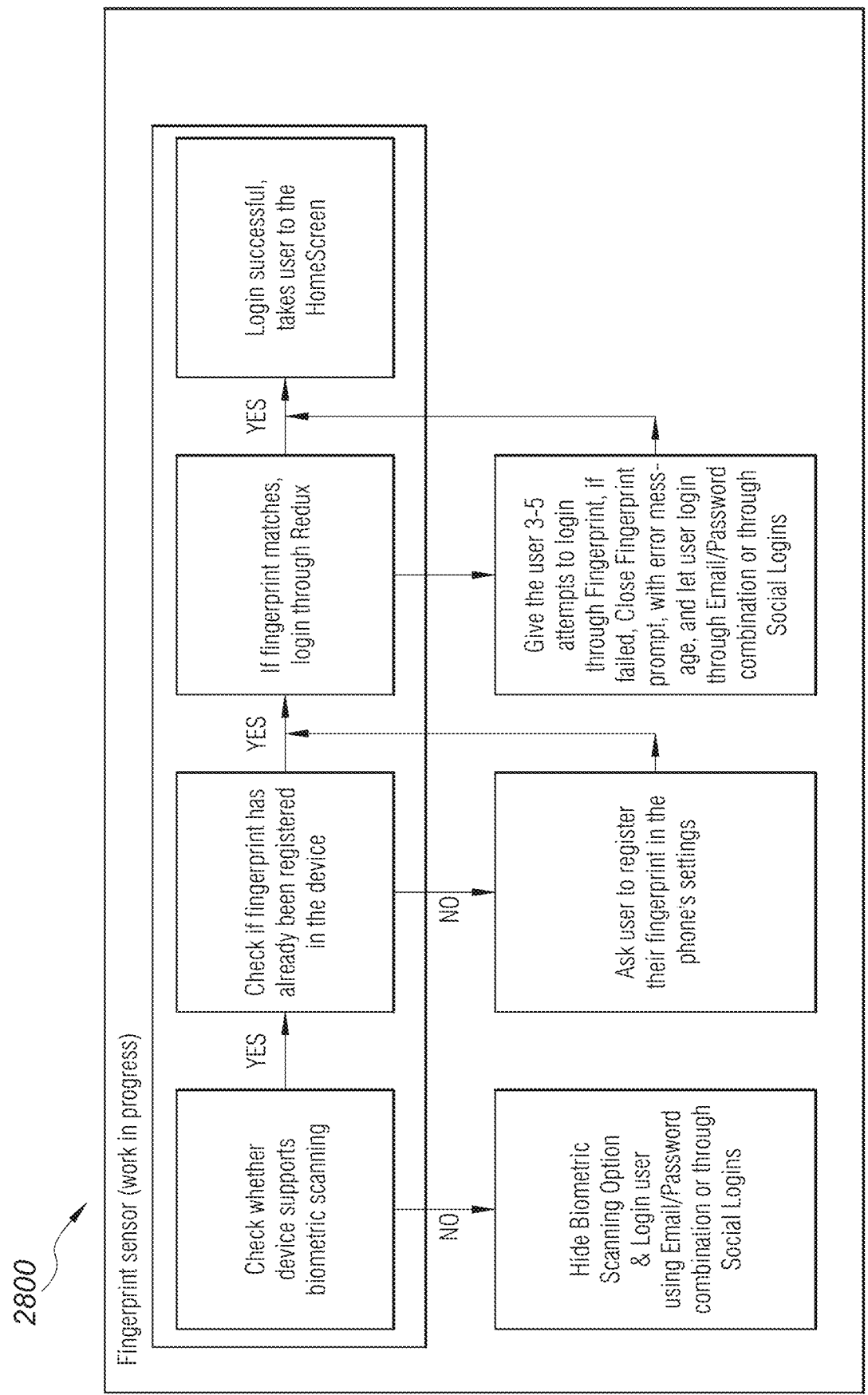
FIG. 28 illustrates an exemplary high-level flow diagram of a fingerprint verification process, according to some embodiments of the present disclosure.

FIG. 28 illustrates an example high-level flow diagram 2800 of a fingerprint verification process 2800, according to some embodiments.

Figure 29:
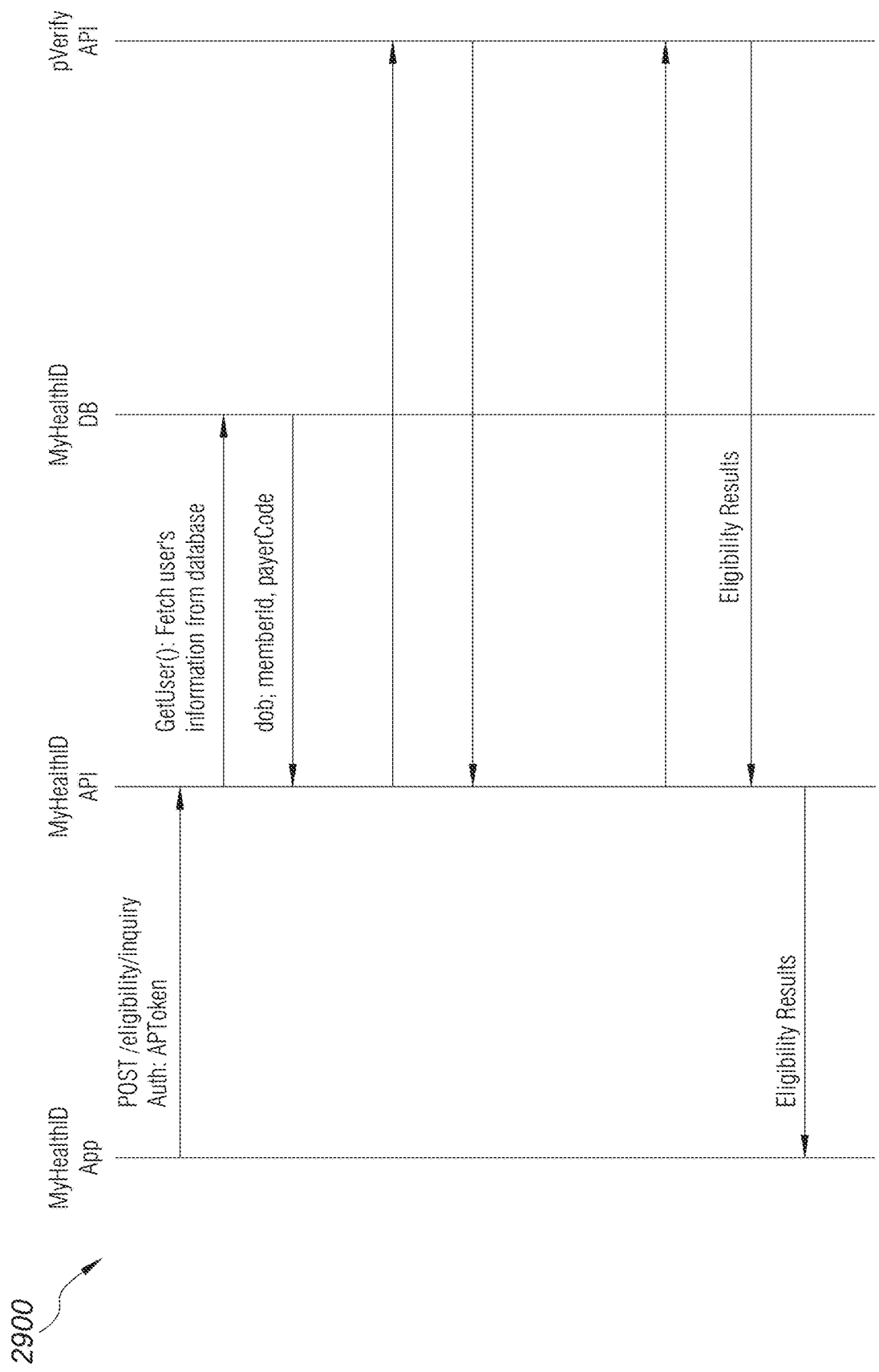
FIG. 29 illustrates an exemplary high-level flow diagram of an eligibility process, according to some embodiments of the present disclosure.

FIG. 29 illustrates an example high-level diagram 2900 of an eligibility process, according to some embodiments.

Architecture

Figure 30A:
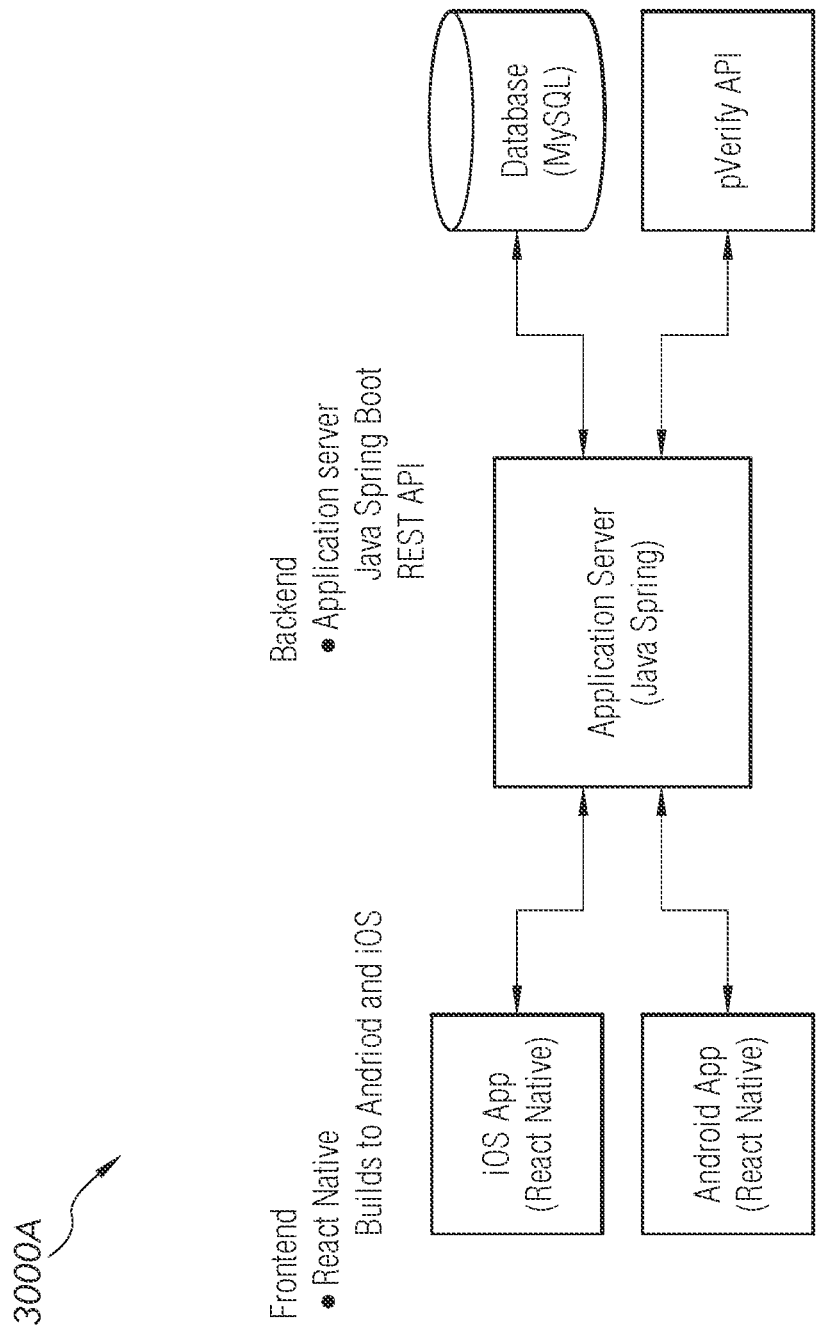
FIG. 30A illustrates an example high-level diagram of an overall system architecture, according to some embodiments of the present disclosure.

FIG. 30A illustrates an example high-level diagram 3000A of an overall system architecture of the present disclosure, according to some embodiments.

In some example applications, backend components of the system may be deployed on Amazon Web Services™, or similar services.

In some example applications, the application server may be deployed on EC2 via Elastic Beanstalk. The method and system may use Bitbucket Pipelines to handle deployment. When code is pushed to the deployment branch, Pipelines runs all unit and integration tests, and, if successful, gets deployed to automatically through Elastic Beanstalk™. The method and system may be deployed on a ml.micro single instance for development environment.

In some example applications, the system database may be or may include a PostgreSQL database that may be maintained by AWS RDS. PostgreSQL is a private subnet that may be accessible only by the application server on the same VPC.

Figure 2A:
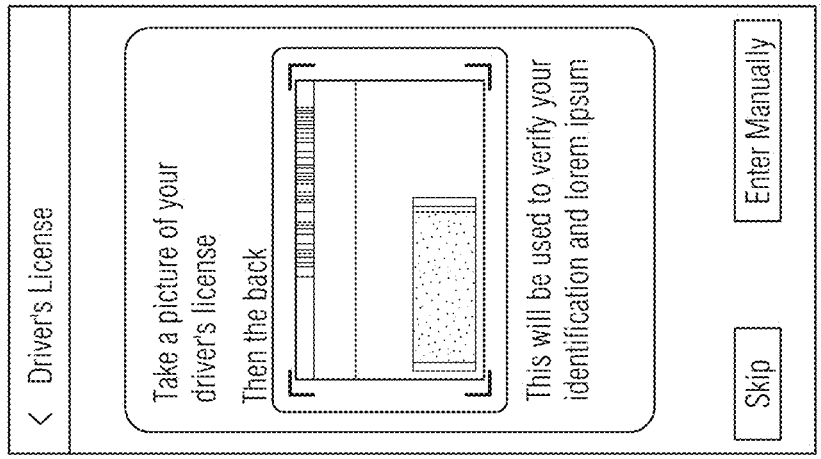
Figure 2A:
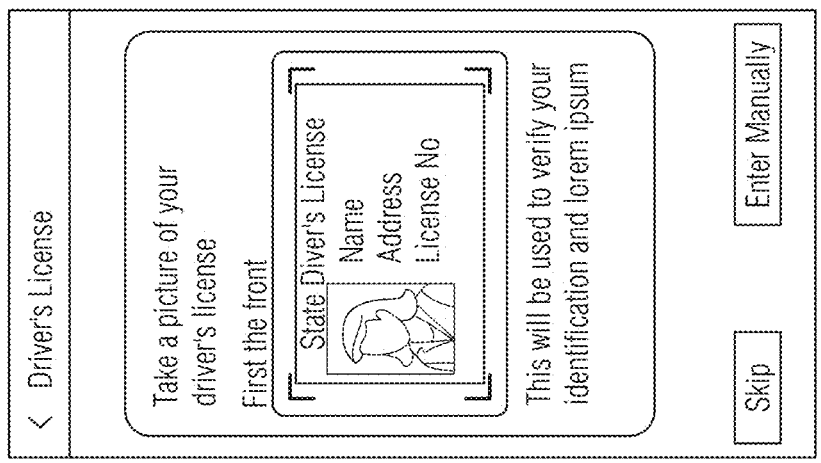
Figure 2C:
FIG. 2C illustrates an exemplary graphical user interface for capturing information from a selfie, according to some embodiments of the present disclosure.
Figure 2C:
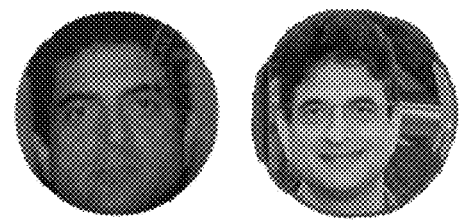
Figure 2C:

FIG. 30B1 illustrates another example high-level diagram 3000B1 of an overall system architecture of the present disclosure, according to some embodiments. In some applications, backend components, doctor's web portal, and Admin web portal may be deployed on Amazon Web Services, or similar services. In some applications, The UAT version of MyHealthID mobile app may be deployed on TestFlight for Apple devices like iPhones and BirdFlight for Android devices, or the likes. In some applications, MyHealthID may be deployed on App Store for Apple devices like iPhones and on Play Store for Android devices. In some applications, the back-end micro services controllers may be deployed on ECS containers on AWS with an API Gateway to manage the inter/intra communications between those containers. In some applications, ELB may also be implemented at the top of the Gateway to maintain the efficiency while and reporting of any containers going down. In some applications, AWS CloudWatch may be used for maintaining health logs of the containers and reporting any breakdown of any backend ECS containers. In some applications, the different web portals (doctor & admin) may be deployed on different S3 buckets with a production build served statically. S3 buckets can be configured to host websites like our portal on a defined Elastic IPs. In some applications, continuous integrations and continued deployments may be configured via Jenkins machine in master-slave architecture instance where it takes the latest code from different GitHub repositories and deploys then AWS services as mentioned in above points. The master instance takes the latest pull, passes it to the slave instance and commands it to run the build scripts. Slave instance is configured with AWS CLI, runs all the build scripts, and deploys them on the different AWS services.

In some example applications, the system database may be or may include a PostgreSQL database that may be maintained by AWS RDS. PostgreSQL is a private subnet that may be accessible only by the application server on the same VPC.

FIG. 30B2 illustrates further exemplary detail for system architecture as illustrated in FIG. 30B1.

It should be noted the specific components and services mentioned above and herein are examples and may be replaced with components and services that provide the same or similar features and functions.

Figure 30C:
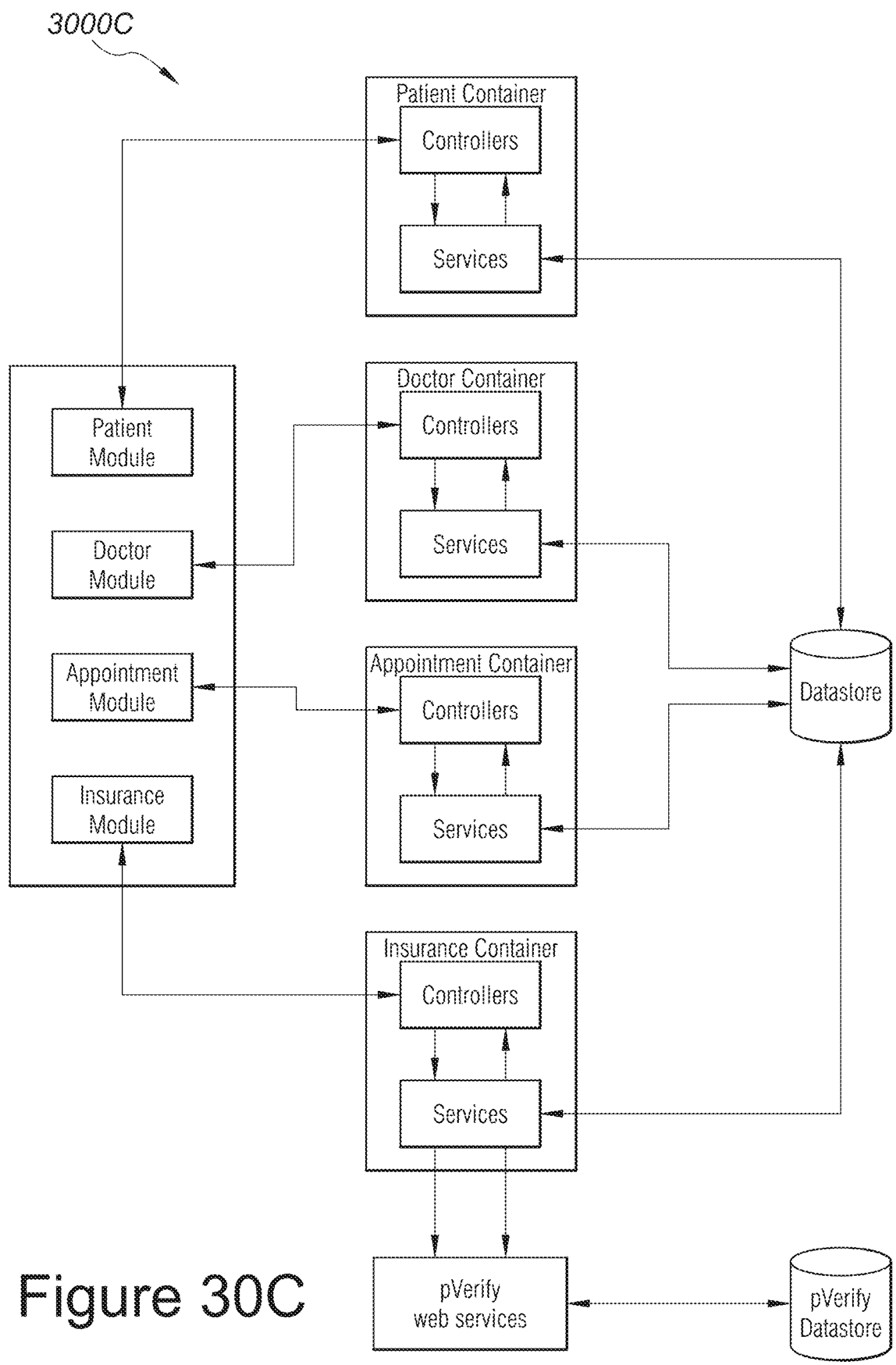
FIG. 30C illustrates example high-level diagram of an overall program architecture, according to some embodiments of the present disclosure.

FIG. 30C illustrates another example high-level diagram 3000C of an overall program architecture of the present disclosure implemented, for example, with NestJS Microservices according to some embodiments. In some embodiments, the software or programs of the present disclosure may include various modules and containers. Note that although the databases are shown as separate, they may be physically or logically separate, and may be local or distributed.

Figure 30D:
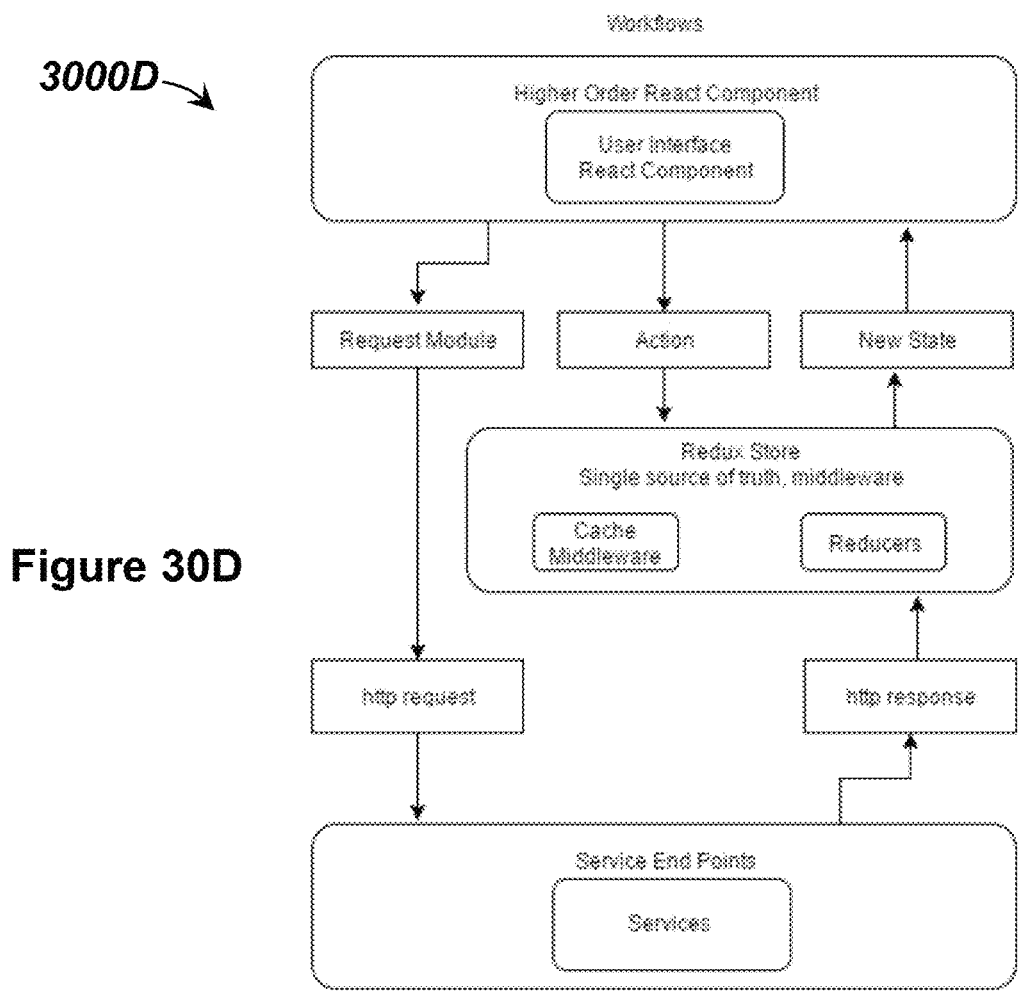
FIG. 30D illustrates an example high-level diagram of an overall program architecture with React or React Native code, according to some embodiments of the present disclosure.

FIG. 30D illustrates an example high-level diagram 3000D of an overall program architecture of the present disclosure implemented, for example, with React or React Native code, according to some embodiments.

Figure 30E:
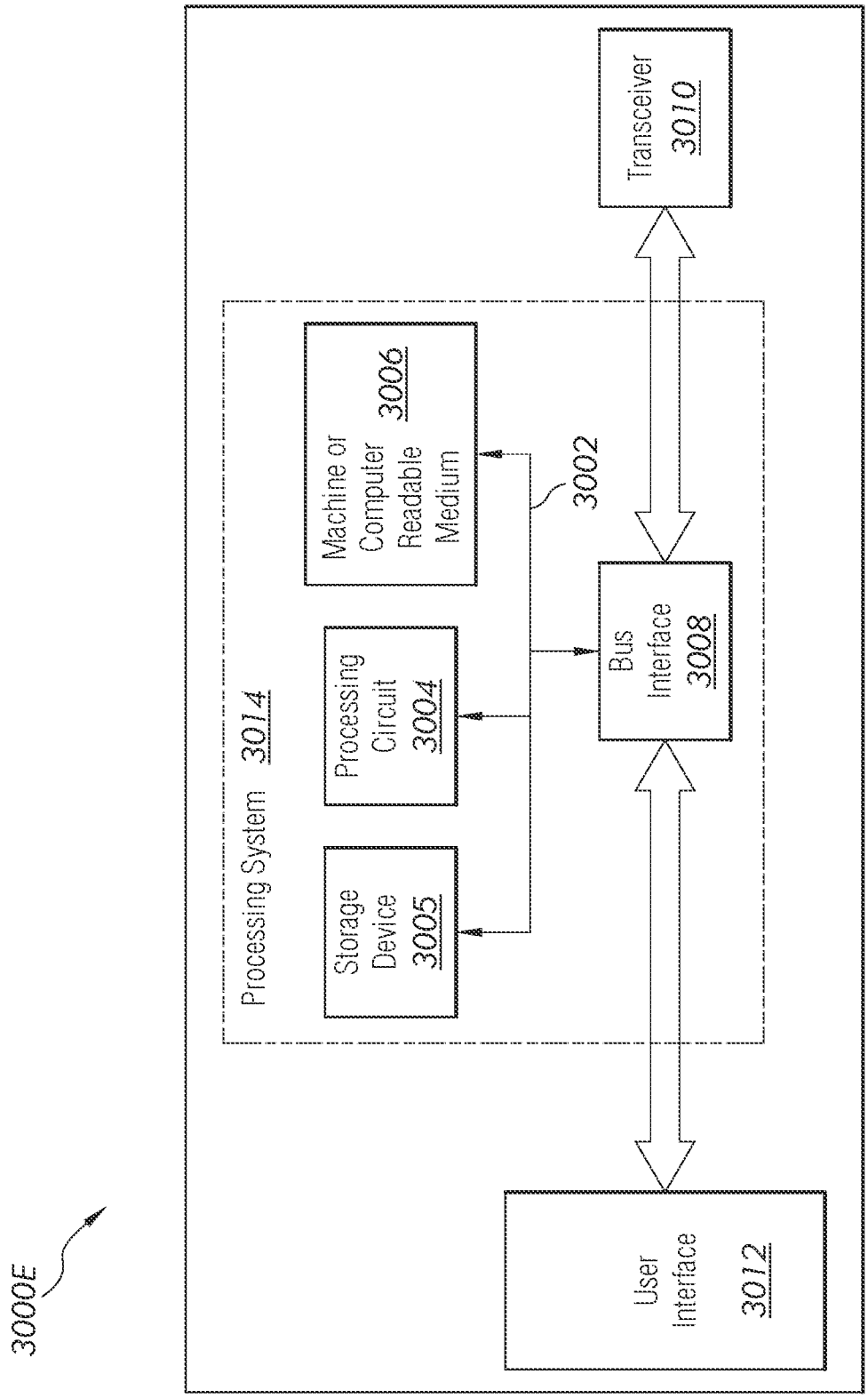
FIG. 30E illustrates an exemplary overall platform (e.g., server, device, etc.) in which various embodiments and process steps disclosed herein can be implemented, according to some embodiments of the present disclosure.

FIG. 30E illustrates an exemplary overall platform (e.g., server, device, etc.) 3000D in which various embodiments and process steps disclosed herein can be implemented. In accordance with various aspects of the disclosure, an element (for example, a host machine or a microgrid controller), or any portion of an element, or any combination of elements may be implemented with a processing system 3014 that includes one or more processing circuits 3004. Processing circuits 3004 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionalities described throughout this disclosure. That is, the processing circuit 3004 may be used to implement any one or more of the various embodiments, systems, algorithms, and processes described above. In some embodiments, the processing system 3014 may be implemented in a server. The server may be local or remote, for example in a cloud architecture.

In the example of FIG. 30E, the processing system 3014 may be implemented with a bus architecture, represented generally by the bus 3002. The bus 3002 may include any number of interconnecting buses and bridges depending on the specific application of the processing system 3014 and the overall design constraints. The bus 3002 may link various circuits including one or more processing circuits (represented generally by the processing circuit 3004), the storage device 3005, and a machine-readable, processor-readable, processing circuit-readable or computer-readable media (represented generally by a non-transitory machine-readable medium 3006). The bus 3002 may also link various other circuits such as timing sources, peripherals, voltage regulators, and power management circuits, which are well known in the art, and therefore, will not be described any further. The bus interface 3008 may provide an interface between bus 3002 and a transceiver 3010. The transceiver 3010 may provide a means for communicating with various other apparatus over a transmission medium. Depending upon the nature of the apparatus, a user interface 3012 (e.g., keypad, display, speaker, microphone, touchscreen, motion sensor) may also be provided.

The processing circuit 3004 may be responsible for managing the bus 3002 and for general processing, including the execution of software stored on the machine-readable medium 3006. The software, when executed by processing circuit 3004, causes processing system 3014 to perform the various functions described herein for any apparatus. Machine-readable medium 3006 may also be used for storing data that is manipulated by processing circuit 3004 when executing software.

One or more processing circuits 3004 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

Blockchain Technology

Figure 31:
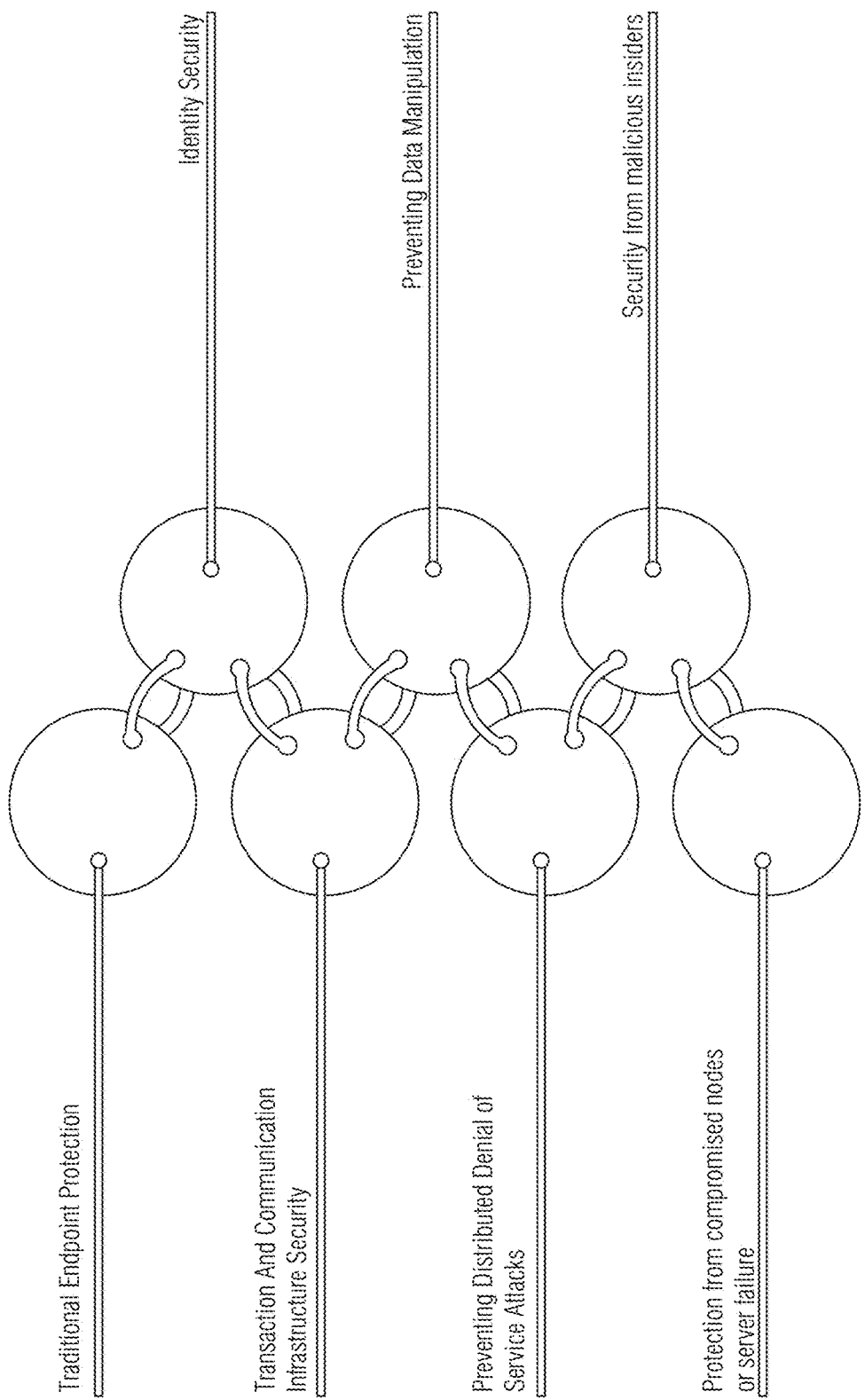
FIG. 31 illustrates an example diagram 3100 showing the incorporating of blockchain technology into the present disclosure, according to some embodiments of the present disclosure.

FIG. 31 illustrates an example diagram 3100 showing the incorporating of blockchain technology into the present disclosure, according to some embodiments.

In some embodiments, management of patient (user) profiles and MyHealthID numbers may require high level measures such as blockchain to enhance traceability and security of application, processes for maintaining up-to-date data, and processes for re-issuing of HealthIDs. In some embodiments, the design methods for utilization of unique HealthIDs can contain built-in artificial intelligence (AI). Examples of AI may include: MyHealthID internal systems can distinguish between issued and re-issued numbers, relationship dependencies between unique numbers (e.g., insured primary versus insurer's dependents), facial recognition for both initial patient (user) signup and image-based searches, and the ability to aggregate data for analytics, just to name a few.

Figure 32:
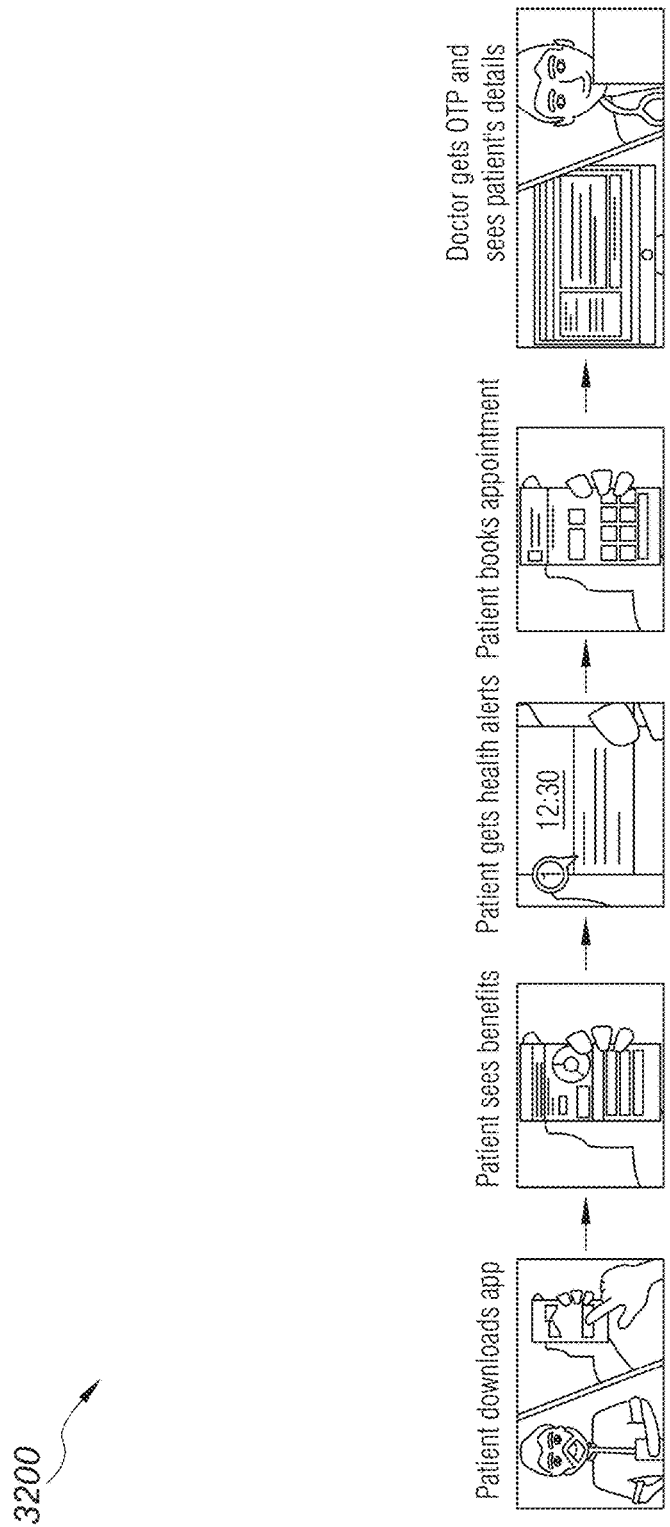
FIG. 32 illustrates an exemplary diagram of a use case, according to some embodiments of the present disclosure.

MyHealthID database may have highly up-to-date patient profiles. This database of valuable information may also be useful in a variety of ways Use Case Example FIG. 32 illustrates an example diagram of use case 3200, according to some embodiments.

As shown, a patient (user) is sick or needs a specific type of procedure. This patient downloads the MyHealthID app and joins. The patient can clearly see healthcare benefit details. The patient searches for a provider in their area and the desired specialty. The app provides a list of providers, the patient selects one of the providers and requests an appointment. The provider group calls the patient and schedules their first appointment. The provider downloads the patient's personal, health, and insurance information. Once the patient arrives at the provider's office the correct copay is paid.

In another example for patient lookup, MyHealthID database of patient profiles may be used to assist healthcare providers find and matchup patient profiles. For example, as a last resort attempt to collect on an outstanding claim, a hospital has incomplete patient demographics and is unable to properly bill the patient and/or insurance payer. Using the information provided by the hospital, the method and system of the present disclosure can provide Patient Lookup services and use different pieces of information to match a MyHealthID profile. The match would provide complete and accurate patient demographics.

OAuth

In some embodiments, OAuth may be an open standard for access delegation, sometimes used as a way for Internet users to grant websites or applications access to their information on other web sites but without giving them the passwords. This mechanism may be used to permit the users to share information about their accounts with third party applications or websites. OAuth may be used for ownership consent and access delegation. OAuth for Healthcare may provide the ability for patients (MyHealthID users) to login/create accounts with healthcare organizations. Similar to how mobile app users can login using a third-party app as an alternative to creating a new login to access an application or website, OAuth for Healthcare powered by MyHealthID will be the authority on patient profiles. Healthcare organizations would recognize that users who login/signup using this method are confident in the identity of the user.

Figure 33:
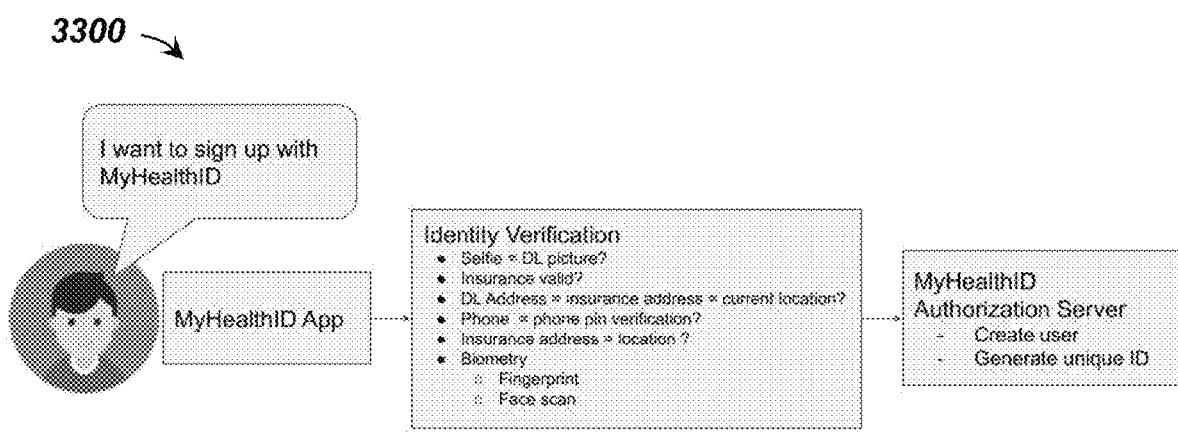
FIG. 33 illustrates an exemplary diagram of an OAuth use case illustrating user signup for identity verification, according to some embodiments of the present disclosure.

FIG. 33 illustrates an example diagram of an OAuth use case 3300 illustrating user signup for identity verification, according to some embodiments.

Figure 34:
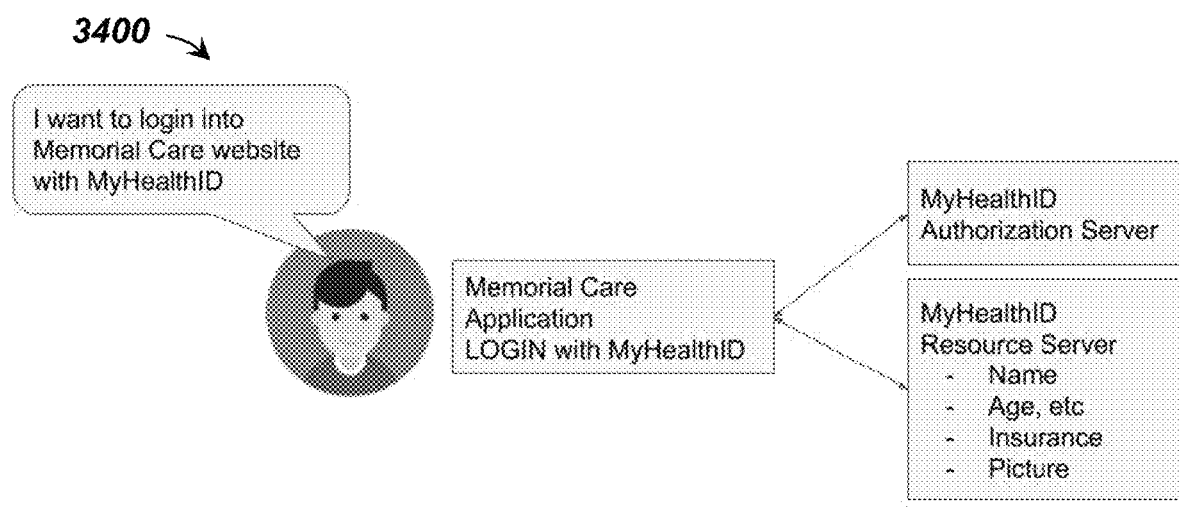
FIG. 34 illustrates an exemplary diagram illustrating an OAuth for Healthcare, according to some embodiments of the present disclosure.

FIG. 34 is an example diagram 3400 illustrating how OAuth for Healthcare powered by MyHealthID can be used by a healthcare organization, according to some embodiments.

Figure 35:
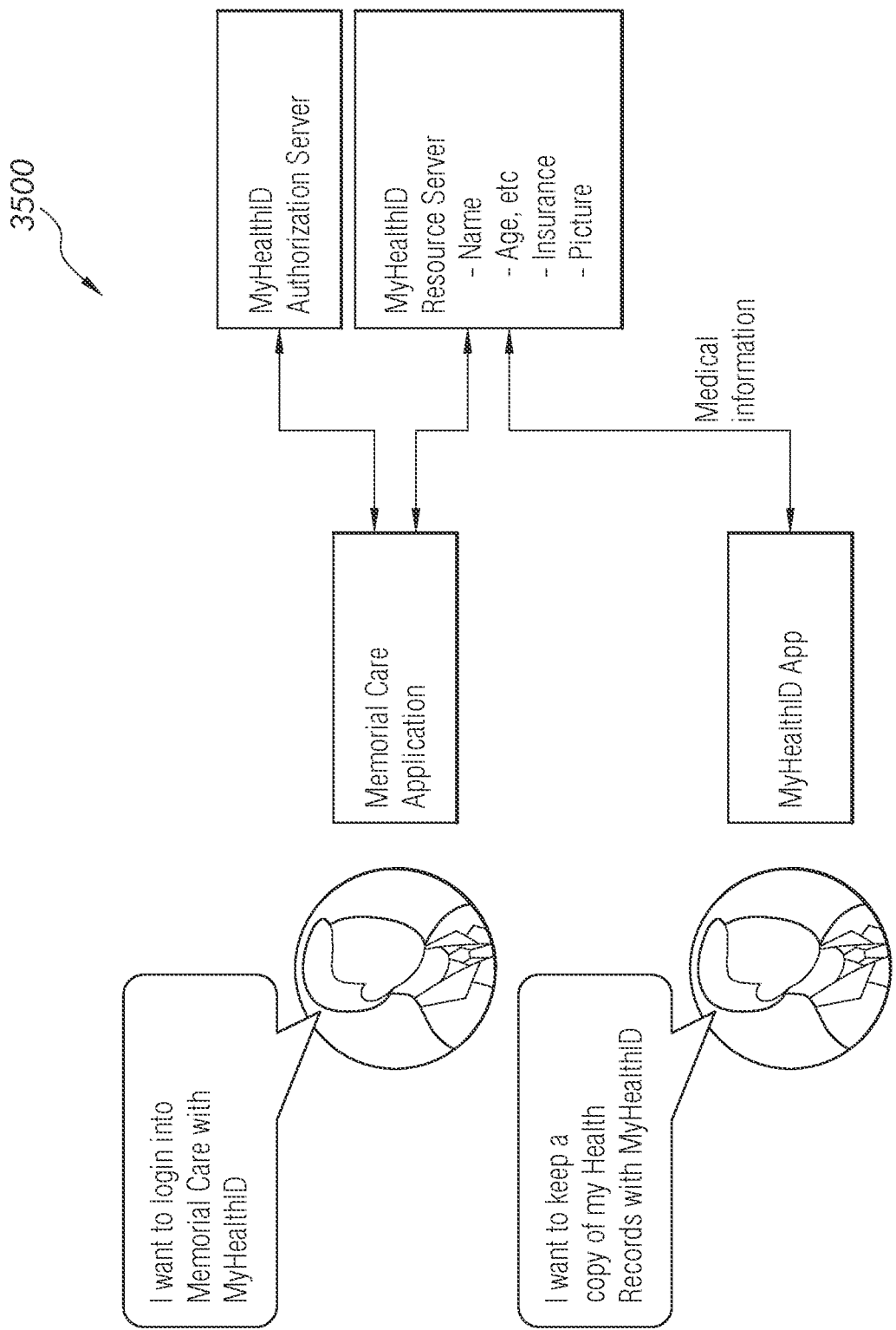
FIG. 35 illustrates an exemplary diagram of a high-level system architecture showing OAuth for Healthcare, according to some embodiments of the present disclosure.

FIG. 35 is an example diagram 3500 illustrating a high-level system architecture showing how OAuth for Healthcare powered by MyHealthID can be used by a user to obtain access to his/her own health records which could potentially be stored within MyHealthID app as a singular location to manage all personal health records from various sources. As shown in this example, Memorial Care is a partner provider using MyHealthID app.

It should also be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

It is to be understood that this disclosure is not limited to the particular embodiments described herein, as such may, of course, vary. It is also to be understood that the terminology used herein is for the purpose of describing particular embodiments only and is not intended to be limiting.

Various aspects have been presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop, mobile such as laptop, etc.), smart phones, personal digital assistants (PDAs), Internet platforms, and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™. . . ), smart cards, solid-state devices (SSDs), and flash memory devices (e.g., card, stick). Of course, those skilled in the art will recognize many modifications may be made to this configuration without departing from the scope of the disclosed aspects.

What is claimed is:

1. A computer-based method for multi-factor identity verification, comprising:
   transmitting a digital passcode to a user device;
   upon receiving the digital passcode from the user device, transmitting a first request to the user device, requesting a first image, wherein the first image comprises at least a first photo of a user and an address of the user;
   upon receiving the first image, transmitting a second request to the user device, requesting a second image, wherein the second image includes a real-time photo of the user;
   upon receiving the second image, validating the first photo with the second photo;
   validating the address of the user; and
   upon successful validation of the first photo and the address of the user, generating a verification score.

2. The computer-based method of claim 1 further comprises generating a unique identification number for the user.

3. The computer-based method of claim 1, wherein the first image is a driver's license of the user.

4. The computer-based method of claim 1, wherein the second image is a real-time selfie of the user.

5. The computer-based method of claim 1, wherein the validating the first photo with the second photo comprises matching the first photo with the second photo.

6. The computer-based method of claim 1, wherein the validating the address of the user comprises matching the address of the user with at least one of an address from an insurance source and a geo-location address.

7. The computer-based method of claim 6, wherein the insurance source is at least one of an insurance card or insurance eligibility data.

8. The computer-based method of claim 1, wherein generating the verification score comprises using a secure random algorithm.

9. The computer-based method of claim 1 further comprises transmitting a third request to the user device, requesting a face scan.

10. The computer-based method of claim 1 further comprises transmitting a fourth request to the user device, requesting a fingerprint.

11. A system for multi-factor identity verification, the system comprising:
   at least one processor; and
   a non-transitory computer-readable medium including computer-executable program instructions; wherein, when the computer-executable program instructions are executed by the at least one processor, the at least one processor:
   transmits a digital passcode to a user device;
   upon receiving the digital passcode from the user device, transmits a first request to the user device, requesting a first image, wherein the first image comprises at least a first photo of a user and an address of the user;
   upon receiving the first image, transmits a second request to the user device, requesting a second image, wherein the second image includes a real-time photo of the user;
   upon receiving the second image, validates the first photo with the second photo;
   validates the address of the user; and
   upon successful validation of the first photo and the address of the user, generates a verification score.

12. The system of claim 11, wherein the at least one processor further generates a unique identification number for the user.

13. The system of claim 11, wherein the first image is a driver's license of the user.

14. The system of claim 11, wherein the second image is a real-time selfie of the user.

15. The system of claim 11, wherein the validating the first photo with the second photo comprises matching the first photo with the second photo.

16. The system of claim 11, wherein the validating the address of the user comprises matching the address of the user with at least one of an address from an insurance source and a geo-location address.

17. The system of claim 16, wherein the insurance source is at least one of an insurance card or insurance eligibility data.

18. The system of claim 11, wherein generating the verification score comprises using a secure random algorithm.

19. The system of claim 11, wherein the at least one processor further transmits a third request to the user device, requesting a face scan.

20. The system of claim 11, wherein the at least one processor further transmits a fourth request to the user device, requesting a fingerprint.

* * * * *